United States Patent
Vibhor et al.

(10) Patent No.: US 9,430,491 B2
(45) Date of Patent: Aug. 30, 2016

(54) REQUEST-BASED DATA SYNCHRONIZATION MANAGEMENT

(71) Applicant: CommVault Systems, Inc., Oceanport, NJ (US)

(72) Inventors: Anand Vibhor, Eatontown, NJ (US); Bhavyan Bharatkumar Mehta, Edison, NJ (US); Amey Vijaykumar Karandikar, Long Branch, NJ (US); Parag Gokhale, Marlboro, NJ (US)

(73) Assignee: COMMVAULT SYSTEMS, INC., Tinton Falls, NJ (US)

( * ) Notice: Subject to any disclaimer, the term of this patent is extended or adjusted under 35 U.S.C. 154(b) by 327 days.

(21) Appl. No.: 13/968,133

(22) Filed: Aug. 15, 2013

(65) Prior Publication Data

US 2014/0201141 A1 Jul. 17, 2014

Related U.S. Application Data

(60) Provisional application No. 61/751,698, filed on Jan. 11, 2013.

(51) Int. Cl.
*G06F 17/30* (2006.01)
*H04L 29/08* (2006.01)

(52) U.S. Cl.
CPC ... *G06F 17/30174* (2013.01); *G06F 17/30581* (2013.01); *H04L 29/0854* (2013.01);
(Continued)

(58) Field of Classification Search
CPC .......... G06F 17/30557; G06F 17/30289; G06F 17/30067; G06F 17/30091; G06F 17/30165; G06F 17/30179; G06F 17/30215; G06F 17/30221; G06F 17/30286; G06F 17/30333; G06F 17/30575; G06F 17/30581;
(Continued)

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| AU | 2006331932 | 12/2006 |
| CA | 2632935 | 12/2006 |

(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Boris Gorney
*Assistant Examiner* — Amanda Willis
(74) *Attorney, Agent, or Firm* — Knobbe, Martens, Olson & Bear LLP

(57) ABSTRACT

In general, a data synchronization management system is disclosed in which files (and/or other data) are synchronized among two or more client computing devices in connection with a backup of those files. Synchronization polices specify files to be synchronized based on selected criteria including file data, metadata, and location information. In general, files are initially copied from a primary client computing device to secondary storage. Thereafter, files to be synchronized are identified from the secondary storage, and copied to other client computing devices. Additionally, synchronized files may be viewed and accessed through a cloud and/or remote file access interface.

15 Claims, 17 Drawing Sheets

(52) U.S. Cl.
CPC ....... *H04L 67/1095* (2013.01); *H04L 67/1097* (2013.01); *H04L 67/18* (2013.01)

(58) Field of Classification Search
CPC ............... G06F 17/30864; G06F 17/30174; G06F 17/30073; G06F 17/30082; G06F 17/30076; G06F 17/30079; G06F 17/30085; G06F 17/30094; G06F 17/30156; G06F 17/302; G06F 17/30203; G06F 17/30212; G06F 17/30303; G06F 17/30554; G06F 17/30566; G06F 17/30; G06F 11/1469; G06F 11/1446; G06F 11/1453; G06F 11/1466; G06F 11/1458; G06F 11/1448; G06F 11/14; G06F 3/065; G06F 3/067; G06F 3/0604; G06F 3/061; G06F 3/0617; G06F 3/0683; G06F 3/0611; G06F 3/0647; G06F 3/0679; G06F 3/0608; G06F 3/0619; G06F 3/0625; G06F 3/0632; G06F 3/0635; G06F 3/064; G06F 3/0643; G06F 3/0646; G06F 3/0656; G06F 3/0659; G06F 3/0671; G06F 3/0676; G06F 3/0688; G06F 3/0689; G06F 21/10; G06F 21/60; G06F 21/604; G06F 21/6218; G06F 21/53; G06F 21/55; G06F 21/552; G06F 21/606; G06F 21/62; G06F 21/6236; G06F 9/45504; G06F 9/4856; G06F 9/5077; G06F 9/544; G06F 9/3004; G06F 9/30047; G06F 9/30087; G06F 9/30185; G06F 9/383; G06F 9/4406; G06F 9/4411; G06F 9/455; G06F 9/45516; G06F 9/45558; G06F 9/467; G06F 9/52; G06F 11/1076; G06F 11/2082; G06F 11/2087; G06F 11/2097; G06F 11/3664; G06F 11/3688; G06F 11/07; G06F 11/10; G06F 11/1048; G06F 11/106; G06F 11/1666; G06F 11/20; G06F 11/2056; G06F 11/2069; G06F 11/2074; G06F 11/2092; G06F 11/2094; G06F 11/3476; G06F 11/3644; G06F 15/167; G06F 15/02; G06F 15/16; G06F 15/17331; G06F 15/177; G06F 13/00; G06F 13/10; G06F 13/28; G06F 13/382; G06F 2212/1016; G06F 2212/1028; G06F 2212/2022; G06F 2212/2542; G06F 2212/264; G06F 2212/466; G06F 2212/604; G06F 2212/622; G06F 2212/7205; G06F 1/3212; G06F 1/3234; G06F 2201/835; G06F 8/61; G06F 8/65; G06F 19/3481; G06F 2009/45562; G06F 2201/82; G06F 2206/1012; G06F 8/458; H04L 29/0854; H04L 67/1095; H04L 67/1097; H04L 67/18
USPC ...................................................... 707/622
See application file for complete search history.

(56) References Cited

U.S. PATENT DOCUMENTS

| | | |
|---|---|---|
| 4,283,787 A | 8/1981 | Chambers |
| 4,296,465 A | 10/1981 | Lemak |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,301,351 A | 4/1994 | Jippo |
| 5,311,509 A | 5/1994 | Heddes et al. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,420,996 A | 5/1995 | Aoyagi |
| 5,448,724 A | 9/1995 | Hayashi et al. |
| 5,454,099 A | 9/1995 | Myers et al. |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,559,991 A | 9/1996 | Kanfi |
| 5,598,546 A | 1/1997 | Blomgren |
| 5,604,862 A | 2/1997 | Midgely et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,675,511 A | 10/1997 | Prasad et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitsky et al. |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,860,104 A | 1/1999 | Witt et al. |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,950,205 A | 9/1999 | Aviani, Jr. |
| 5,956,519 A | 9/1999 | Wise et al. |

(56) References Cited

U.S. PATENT DOCUMENTS

| | | |
|---|---|---|
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Steiner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,061,692 A | 5/2000 | Thomas et al. |
| 6,072,490 A | 6/2000 | Bates et al. |
| 6,076,148 A | 6/2000 | Kedem et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome et al. |
| 6,212,512 B1 | 4/2001 | Barney et al. |
| 6,212,521 B1 | 4/2001 | Minami et al. |
| 6,230,164 B1 | 5/2001 | Rikieta et al. |
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,397,308 B1 | 5/2002 | Ofek et al. |
| 6,418,478 B1 | 7/2002 | Ignatius et al. |
| 6,421,711 B1 | 7/2002 | Blumenau et al. |
| 6,434,681 B1 | 8/2002 | Amangau |
| 6,473,775 B1 | 10/2002 | Kusters et al. |
| 6,487,561 B1 | 11/2002 | Ofek et al. |
| 6,487,644 B1 | 11/2002 | Huebsch et al. |
| 6,487,645 B1 | 11/2002 | Clark et al. |
| 6,502,205 B1 | 12/2002 | Yanai et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,581,143 B2 | 6/2003 | Gagne et al. |
| 6,604,118 B2 | 8/2003 | Kleinman et al. |
| 6,604,149 B1 | 8/2003 | Deo et al. |
| 6,615,223 B1 | 9/2003 | Shih et al. |
| 6,631,477 B1 | 10/2003 | LeCrone et al. |
| 6,631,493 B2 | 10/2003 | Ottesen et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,721,767 B2 | 4/2004 | De Meno et al. |
| 6,728,733 B2 | 4/2004 | Tokui |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,518 B2 | 9/2004 | Armangau et al. |
| 6,799,258 B1 | 9/2004 | Linde |
| 6,836,779 B2 | 12/2004 | Poulin |
| 6,871,163 B2 | 3/2005 | Hiller et al. |
| 6,871,271 B2 | 3/2005 | Ohran et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,952,758 B2 | 10/2005 | Chron et al. |
| 6,954,834 B2 | 10/2005 | Slater et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,473 B2 | 2/2006 | Curtis et al. |
| 7,003,641 B2 | 2/2006 | Prahlad et al. |
| 7,032,131 B2 | 4/2006 | Lubbers et al. |
| 7,035,880 B1 | 4/2006 | Crescenti et al. |
| 7,039,661 B1 | 5/2006 | Ranade |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,120,757 B2 | 10/2006 | Tsuge |
| 7,130,860 B2 | 10/2006 | Pachet |
| 7,130,970 B2 | 10/2006 | Devassy et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,162,496 B2 | 1/2007 | Amarendran et al. |
| 7,174,433 B2 | 2/2007 | Kottomtharayil et al. |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,203,807 B2 | 4/2007 | Urabe et al. |

(56) References Cited

U.S. PATENT DOCUMENTS

| | | |
|---|---|---|
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,228,456 B2 | 6/2007 | Lecrone et al. |
| 7,231,544 B2 | 6/2007 | Tan et al. |
| 7,234,115 B1 | 6/2007 | Sprauve et al. |
| 7,246,140 B2 | 7/2007 | Therrien et al. |
| 7,246,207 B2 | 7/2007 | Kottomtharayil et al. |
| 7,257,689 B1 | 8/2007 | Baird |
| 7,269,612 B2 | 9/2007 | Devarakonda et al. |
| 7,272,606 B2 | 9/2007 | Borthakur et al. |
| 7,275,138 B2 | 9/2007 | Saika |
| 7,275,177 B2 | 9/2007 | Amangau et al. |
| 7,278,142 B2 | 10/2007 | Bandhole et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,370,232 B2 | 5/2008 | Safford |
| 7,373,364 B1 | 5/2008 | Chapman |
| 7,380,072 B2 | 5/2008 | Kottomtharayil et al. |
| 7,389,311 B1 | 6/2008 | Crescenti et al. |
| 7,395,282 B1 | 7/2008 | Crescenti et al. |
| 7,409,509 B2 | 8/2008 | Devassy et al. |
| 7,415,488 B1 | 8/2008 | Muth et al. |
| 7,421,411 B2 | 9/2008 | Kontio et al. |
| 7,430,587 B2 | 9/2008 | Malone et al. |
| 7,433,301 B2 | 10/2008 | Akahane et al. |
| 7,440,982 B2 | 10/2008 | Lu et al. |
| 7,454,569 B2 | 11/2008 | Kavuri et al. |
| 7,467,167 B2 | 12/2008 | Patterson |
| 7,467,267 B1 | 12/2008 | Mayock |
| 7,472,238 B1 | 12/2008 | Gokhale |
| 7,475,284 B2 | 1/2009 | Koike |
| 7,483,925 B2 | 1/2009 | Koskimies et al. |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,496,690 B2 | 2/2009 | Beverly et al. |
| 7,500,053 B1 | 3/2009 | Kavuri et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,519,726 B2 | 4/2009 | Palliyll et al. |
| 7,529,748 B2 | 5/2009 | Wen et al. |
| 7,529,782 B2 | 5/2009 | Prahlad et al. |
| 7,532,340 B2 | 5/2009 | Koppich et al. |
| 7,536,291 B1 | 5/2009 | Retnamma et al. |
| 7,539,707 B2 | 5/2009 | Prahlad et al. |
| 7,543,125 B2 | 6/2009 | Gokhale |
| 7,546,324 B2 | 6/2009 | Prahlad et al. |
| 7,565,572 B2 | 7/2009 | Yamasaki |
| 7,596,586 B2 | 9/2009 | Gokhale et al. |
| 7,603,386 B2 | 10/2009 | Amarendran et al. |
| 7,606,841 B1 | 10/2009 | Ranade |
| 7,606,844 B2 | 10/2009 | Kottomtharayil |
| 7,613,748 B2 | 11/2009 | Brockway et al. |
| 7,613,750 B2 | 11/2009 | Valiyaparambil et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,617,541 B2 | 11/2009 | Plotkin et al. |
| 7,620,710 B2 | 11/2009 | Kottomtharayil et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,668,798 B2 | 2/2010 | Scanlon et al. |
| 7,685,126 B2 | 3/2010 | Patel et al. |
| 7,716,171 B2 | 5/2010 | Kryger |
| 7,734,715 B2 | 6/2010 | Hyakutake et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 7,810,067 B2 | 10/2010 | Kaelicke et al. |
| 7,840,533 B2 | 11/2010 | Prahlad et al. |
| 7,840,537 B2 | 11/2010 | Gokhale et al. |
| 7,870,355 B2 | 1/2011 | Erofeev |
| 7,962,455 B2 | 6/2011 | Erofeev |
| 7,962,709 B2 | 6/2011 | Agrawal |
| 8,024,294 B2 | 9/2011 | Kottomtharayil |
| 8,121,983 B2 | 2/2012 | Prahlad et al. |
| 8,166,263 B2 | 4/2012 | Prahlad |
| 8,170,995 B2 | 5/2012 | Prahlad et al. |
| 8,195,623 B2 | 6/2012 | Prahlad et al. |
| 8,204,859 B2 | 6/2012 | Ngo |
| 8,219,524 B2 | 7/2012 | Gokhale |
| 8,229,888 B1 | 7/2012 | Roskind et al. |
| 8,229,954 B2 | 7/2012 | Kottomtharayil et al. |
| 8,271,830 B2 | 9/2012 | Erofeev |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,554,951 B2 | 10/2013 | Barton et al. |
| 8,578,120 B2 | 11/2013 | Attarde et al. |
| 2001/0029517 A1 | 10/2001 | De Meno et al. |
| 2001/0035866 A1 | 11/2001 | Finger et al. |
| 2001/0042222 A1 | 11/2001 | Kedem et al. |
| 2001/0044807 A1 | 11/2001 | Kleiman et al. |
| 2002/0002557 A1 | 1/2002 | Straube et al. |
| 2002/0004883 A1 | 1/2002 | Nguyen et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0069324 A1 | 6/2002 | Gerasimov et al. |
| 2002/0083055 A1 | 6/2002 | Pachet et al. |
| 2002/0103848 A1 | 8/2002 | Giacomini et al. |
| 2002/0107877 A1 | 8/2002 | Whiting et al. |
| 2002/0133511 A1 | 9/2002 | Hostetter et al. |
| 2002/0133512 A1 | 9/2002 | Milillo et al. |
| 2002/0161753 A1 | 10/2002 | Inaba et al. |
| 2002/0174107 A1 | 11/2002 | Poulin |
| 2002/0174416 A1 | 11/2002 | Bates et al. |
| 2003/0018657 A1 | 1/2003 | Monday |
| 2003/0028736 A1 | 2/2003 | Berkowitz et al. |
| 2003/0061491 A1 | 3/2003 | Jaskiewicz et al. |
| 2003/0131278 A1 | 7/2003 | Fujibayashi |
| 2003/0135783 A1 | 7/2003 | Martin et al. |
| 2003/0167380 A1 | 9/2003 | Green et al. |
| 2003/0177149 A1 | 9/2003 | Coombs |
| 2003/0177321 A1 | 9/2003 | Watanabe |
| 2003/0187847 A1 | 10/2003 | Lubbers et al. |
| 2004/0015468 A1 | 1/2004 | Beier et al. |
| 2004/0098425 A1 | 5/2004 | Wiss et al. |
| 2004/0107199 A1 | 6/2004 | Dairymple et al. |
| 2004/0117572 A1 | 6/2004 | Welsh et al. |
| 2004/0139128 A1 | 7/2004 | Becker et al. |
| 2004/0193953 A1 | 9/2004 | Callahan et al. |
| 2004/0205206 A1 | 10/2004 | Naik et al. |
| 2004/0230829 A1 | 11/2004 | Dogan et al. |
| 2004/0236958 A1 | 11/2004 | Teicher et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267835 A1 | 12/2004 | Zwilling et al. |
| 2004/0267836 A1 | 12/2004 | Amangau et al. |
| 2005/0027892 A1 | 2/2005 | McCabe et al. |
| 2005/0033800 A1 | 2/2005 | Kavuri et al. |

(56) References Cited

U.S. PATENT DOCUMENTS

| | | |
|---|---|---|
| 2005/0080928 A1 | 4/2005 | Beverly et al. |
| 2005/0086443 A1 | 4/2005 | Mizuno et al. |
| 2005/0108292 A1 | 5/2005 | Burton et al. |
| 2005/0114406 A1 | 5/2005 | Borthakur et al. |
| 2005/0144195 A1 | 6/2005 | Hesselink et al. |
| 2005/0144202 A1 | 6/2005 | Chen |
| 2005/0187982 A1 | 8/2005 | Sato |
| 2005/0187992 A1 | 8/2005 | Prahlad et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0246376 A1 | 11/2005 | Lu et al. |
| 2005/0268068 A1 | 12/2005 | Ignatius et al. |
| 2006/0005048 A1 | 1/2006 | Osaki et al. |
| 2006/0010227 A1 | 1/2006 | Atluri |
| 2006/0020616 A1 | 1/2006 | Hardy et al. |
| 2006/0047805 A1 | 3/2006 | Byrd et al. |
| 2006/0129537 A1 | 6/2006 | Torii et al. |
| 2006/0136685 A1 | 6/2006 | Griv et al. |
| 2006/0224846 A1 | 10/2006 | Amarendran et al. |
| 2006/0230244 A1 | 10/2006 | Amarendran et al. |
| 2006/0242371 A1 | 10/2006 | Shono et al. |
| 2007/0043956 A1 | 2/2007 | El Far et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0124347 A1 | 5/2007 | Vivian et al. |
| 2007/0124348 A1 | 5/2007 | Claborn et al. |
| 2007/0143371 A1* | 6/2007 | Kottomtharayil ............ 707/204 |
| 2007/0143756 A1 | 6/2007 | Gokhale |
| 2007/0179990 A1 | 8/2007 | Zimran et al. |
| 2007/0183224 A1 | 8/2007 | Erofeev |
| 2007/0185937 A1 | 8/2007 | Prahlad et al. |
| 2007/0185938 A1 | 8/2007 | Prahlad et al. |
| 2007/0185939 A1 | 8/2007 | Prahland et al. |
| 2007/0185940 A1 | 8/2007 | Prahlad et al. |
| 2007/0186042 A1 | 8/2007 | Kottomtharayil et al. |
| 2007/0186068 A1 | 8/2007 | Agrawal |
| 2007/0226438 A1 | 9/2007 | Erofeev |
| 2007/0244571 A1 | 10/2007 | Wilson et al. |
| 2007/0288536 A1 | 12/2007 | Sen et al. |
| 2008/0016293 A1 | 1/2008 | Saika |
| 2008/0059515 A1 | 3/2008 | Fulton |
| 2008/0104357 A1 | 5/2008 | Kim et al. |
| 2008/0183775 A1 | 7/2008 | Prahlad et al. |
| 2008/0229037 A1 | 9/2008 | Bunte et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0244177 A1 | 10/2008 | Crescenti et al. |
| 2008/0306954 A1 | 12/2008 | Hornqvist |
| 2009/0044046 A1 | 2/2009 | Yamasaki |
| 2009/0150462 A1 | 6/2009 | McClanahan et al. |
| 2009/0319534 A1 | 12/2009 | Gokhale |
| 2009/0319540 A1 | 12/2009 | Suthar et al. |
| 2010/0122053 A1 | 5/2010 | Prahlad et al. |
| 2010/0131461 A1 | 5/2010 | Prahlad et al. |
| 2010/0131467 A1 | 5/2010 | Prahlad et al. |
| 2010/0179941 A1 | 7/2010 | Agrawal et al. |
| 2010/0205150 A1 | 8/2010 | Prahlad et al. |
| 2010/0211571 A1 | 8/2010 | Prahlad et al. |
| 2011/0066599 A1 | 3/2011 | Prahlad et al. |
| 2011/0238621 A1 | 9/2011 | Agrawal |
| 2011/0246416 A1 | 10/2011 | Prahlad et al. |
| 2012/0150818 A1 | 6/2012 | Vijayan Retnamma et al. |
| 2012/0150826 A1 | 6/2012 | Vijayan Retnamma et al. |
| 2013/0238696 A1 | 9/2013 | Cotelo |
| 2014/0172793 A1* | 6/2014 | Stritzel et al. ............ 707/634 |
| 2014/0201137 A1 | 7/2014 | Vibhor et al. |
| 2014/0201140 A1 | 7/2014 | Vibhor et al. |
| 2014/0201144 A1 | 7/2014 | Vibhor et al. |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| EP | 1974296 | 10/2008 |
| GB | 2256952 | 12/1992 |
| GB | 2411030 | 8/2005 |
| JP | 05-189281 | 7/1993 |
| JP | 06-274605 | 9/1994 |
| JP | 09016463 | 1/1997 |
| JP | 11-259348 | 9/1999 |
| JP | 2000-347811 | 12/2000 |
| WO | WO 93/03549 | 2/1993 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 02/095632 | 11/2002 |
| WO | WO 03/028183 | 4/2003 |
| WO | WO 2004/034197 | 4/2004 |
| WO | WO 2005/055093 | 6/2005 |
| WO | WO 2005/086032 | 9/2005 |
| WO | WO 2006/052872 | 5/2006 |
| WO | WO 2007/053314 | 5/2007 |
| WO | WO 2007/075587 | 7/2007 |
| WO | WO 2010/068570 | 6/2010 |

OTHER PUBLICATIONS

Arneson, "Development of Omniserver; Mass Storage Systems," Control Data Corporation, 1990, pp. 88-93.

Arneson, "Mass Storage Archiving in Network Environments" IEEE, 1998, pp. 45-50.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Gray (#1 of 2, pp. 646-655), Jim; Reuter, Andreas, Transaction Processing: Concepts and Techniques, Morgan Kaufmann Publisher, USA 1994, 1994, pp. 646-655.

Gray (#2 of 2, pp. 604-609), Jim; Reuter Andreas, Transaction Processing Concepts and Techniques, Morgan Kaufmann Publisher, USA 1994, pp. 604-609.

Harrington, Lisa H., "The RFP Process: How to Hire a Third Party", Transportation & Distribution, Sep. 1988, vol. 39, Issue 9, in 5 pages.

http://en.wikipedia.org/wiki/Naive_Bayes_classifier, printed on Jun. 1, 2010, in 7 pages.

Jander, "Launching Storage-Area Net," Data Communications, US, McGraw Hill, NY, vol. 27, No. 4(Mar. 21, 1998), pp. 64-72.

Kashyap, et al., "Professional Services Automation: A knowledge Mangement approach using LSI and Domain specific Ontologies", FLAIRS-01 Proceedings, 2001, pp. 300-302.

(56) References Cited

OTHER PUBLICATIONS

Lyon J., Design considerations in replicated database systems for disaster protection, COMPCON 1988, Feb. 29, 1988, pp. 428-430.

Microsoft Corporation, "Microsoft Exchange Server: Best Practices for Exchange Database Management," 1998.

The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009.

Rosenblum et al., "The Design and Implementation of a Log-Structure File System," Operating Systems Review SIGOPS, vol. 25, No. 5, New York, US, pp. 1-15 (May 1991).

Veritas Software Corporation, "Veritas Volume Manager 3.2, Administrator's Guide," Aug. 2001, 360 pages.

Wiesmann M, Database replication techniques: a three parameter classification, Oct. 16, 2000, pp. 206-215.

Huff, KL, "Data Set Usage Sequence Number," IBM Technical Disclosure Bulletin, vol. 24, No. 5, Oct. 1981 New York, US, pp. 2404-2406.

* cited by examiner

730

My Backups > backup1

Backup

Last Backup: Aug 22, 2012 01:19:46 AM
Last Backup Size: 0
Total Backup Size: 0
Last Seen Online: Aug 22, 2012 06:39:50 PM
    Recent Backup Jobs Next Backup: Not Scheduled
[Backup Now]

Current Backup Status (Jon Id: 260)
▓▓▓▓▓▓ 25%
Data Protected: 0
Time Started: 08/22/12 01:19 AM
Time Elapsed: 24 Mins. 43 Secs.
Pause | Kill      Job Pending Schedules: [⊕ Subscribe]

Content: C:\Documents and Settings , C:\DR Folder , C:\Log Files , C:\Default User , C:\ProgramData , C:\Documents and Settings\Administrator , *.doc
[Edit]

Sync

Cloud Folders: folder1
732 — [⊕ Cloud Folder]

Restore

[Select Files →]
Recent Restore Jobs

Alerts

☐ Laptop Data Protection Alert
☑ Laptop Data Recovery Alert

[Save] [Reset] [Clear]

Last Seen Location

[Map | Sat | Ter | Earth]

FIG. 7D

REQUEST-BASED DATA SYNCHRONIZATION MANAGEMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

The present application is being filed concurrently with U.S. application Ser. No. 13/968,120, titled "DATA SYNCHRONIZATION MANAGEMENT," U.S. application Ser. No. 13/968,023, titled "CRITERIA-BASED DATA SYNCHRONIZATION MANAGEMENT," and U.S. application Ser. No. 13/968,091, titled "LOCATION-BASED DATA SYNCHRONIZATION MANAGEMENT," each of which is hereby incorporated herein by reference in its entirety.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, data synchronization, and the like, are in increasing demand.

SUMMARY

Generally described, aspects of the present disclosure are directed to a data synchronization management system that may synchronize files (and/or other data) among two or more client computing devices, in addition to backing up the files. In an embodiment, a user of the data synchronization management system may specify one or more file synchronization policies. A file synchronization policy may specify the files that are to be synchronized, as well as the devices and locations to which those files are to be synchronized. For example, a user may create file synchronization policy and specify that all the files in a particular directory on their laptop are to be synchronized. Further, the user may specify that those files are to be synchronized to their desktop computer. The user may also optionally specify a synchronization schedule, and/or a one-way or two-way file synchronization. The data synchronization management system may work in conjunction with data backup policies.

In an embodiment, a file synchronization proceeds as follows. Specified files are backed up or otherwise copied from the source client computing device to a secondary backup storage. The files to be synchronized are identified based both on the synchronization policy, and whether or not they have changed since the last backup. Thus, if a file backed up (and to be synchronized) is unchanged as compared to the previously backed up copy, that file is not synchronized. Any files identified for synchronization are synchronized to the one or more destination client computing devices, which are specified according to the synchronization policy of the user.

In an embodiment, a user may specify the files to be synchronized. Files to be synchronized may be directly selected or otherwise identified, or criteria may be specified to indirectly identify the files to be synchronized. For instance, without limitation, files may be identified by detecting the existence of specified content within the file (such as the existence of one or more specified terms within a document), and/or by matching metadata associated with the file with one or more specified metadata parameters (such as filename, file owner, directory, creation date, modification date, size, type, location, Global Positioning System (GPS) coordinates, among others). The criteria used to identify files to be synchronized can vary. For example, files to be synchronized may be identified as the files in a certain directory that were created after a certain date.

In an embodiment, the data synchronization management system may add location information to files that are backed up. Thus, a file to be synchronized may be identified according to the geographic location at which it was created and/or modified. Location information may include, for example, GPS coordinates gathered by the client computing device including, for example, a GPS receiver.

In an embodiment, a user of the data synchronization management system may access synchronized files through a cloud and/or remote file access interface. For example, the user may access their files through a web browser after their identity is authenticated. In this embodiment, a file list may initially be accessible by the user. Thereafter, a user may request access to a particular file. At this point the requested file data may be transferred from a secondary storage (backup) to the user's computer so that the user may access the file.

For purposes of summarizing the disclosure, certain aspects, advantages and novel features thereof have been described herein. Of course, it is to be understood that not necessarily all such aspects, advantages or features will be embodied in any particular embodiment of the invention.

According to an embodiment, a computer-implemented method of providing access to files stored at one or more remote secondary storage devices is disclosed, the computer-implemented method comprising: receiving a listing of one or more files that are designated to be synchronized to a first client computing device from a second client computing device, each of the first client computing device and the second client computing device in communication with a secondary storage subsystem that stores secondary copies of data associated with the first client computing device and the second client computing device; initiating, by a synchronization module executing on computer hardware comprising one or more computer processors, synchronization of the designated files to the first client computing device from the second client computing device; and in response to a request for a particular file, wherein the request is from a user that is entered via interaction with the first client computing device, and where the request is received after said initiating synchronization of the designated files to the first client computing device and prior to completion of the synchronization of the particular file to the first client computing device: determining, by the synchronization module, that the synchronization of the particular file to the first client computing device is not yet complete; completing the synchronization of the particular file to the first client computing device by causing communication of a copy of the particular file from the secondary storage subsystem to the first client computing device, where the copy of the particular file was retrieved from a secondary copy associated with the second client computing device; and providing the user access to the synchronized particular file at the first client computing device.

According to an aspect, the designated files that are synchronized to the first client computing device from the second client computing device are accessed from the one or more secondary storage devices.

According to an aspect, the identification of the designated file is performed in response to the secondary copy operation.

According to an aspect, the particular file communicated to the first client computing device replaces a previous version of the particular file stored in the first primary storage device.

According to another embodiment, a computer-implemented method of providing access to files stored at one or more remote secondary storage devices is disclosed, the computer-implemented method comprising: accessing, by a synchronization module executing in computer hardware comprising one or more computer processors, user-defined synchronization criteria for identifying files to synchronize between a first primary storage device associated with a first client computing device and a second primary storage device associated with a second client computing device; initiating a secondary copy operation in which one or more files stored in the first primary storage device are copied to one or more secondary storage devices to create a secondary copy including the one or more files; after the initiation of the secondary copy operation, and based on the user-defined synchronization criteria, identifying, by the synchronization module, at least one file in the secondary copy to synchronize between the first primary storage device and the second primary storage device; after communicating a listing of the at least one file to the second client computing device, initiating, by the synchronization module, synchronization of the at least one file to the second client computing device; and in response to receiving a request from the second client computing device for a particular file, and where the request is received after said initiating synchronization of the at least one file to the second client computing device and prior to completion of the synchronization of a particular file to the second client computing device: completing the synchronization of the particular file to the second client computing device by causing communication of a copy of the particular file from the secondary storage subsystem to the second client computing device, where the copy of the particular file was retrieved from a secondary copy associated with the first client computing device.

According to an aspect, the at least one file that is synchronized to the second client computing device is accessed from the one or more secondary storage devices.

According to an aspect, the identification of the at least one file is performed in response to the secondary copy operation.

According to an aspect, the particular file communicated to the second client computing device replaces a previous version of the particular file stored in the second primary storage device.

According to an aspect, the method further comprises: receiving the user-defined synchronization criteria at the synchronization module; and storing the received user-defined synchronization criteria in an electronic data store accessible by the synchronization module.

According to an aspect, the user-defined synchronization criteria are received from a user of at least one of the first client computing device or the second client computing device.

According to an aspect, the electronic data store is associated with a storage manager module executing in the computer hardware comprising the one or more computer processors.

According to an aspect, at least one of said accessing, said initiating the secondary copy operation, said identifying, initiating synchronization, or said completing is performed by the storage manager module.

According to an aspect, the user-defined synchronization criteria include at least one of: file data, file contents, file metadata, file name, file location, or location information.

According to an aspect, identifying at least one file in the secondary copy to synchronize between the first primary storage device and the second primary storage device comprises, for each specific file of the one or more files being copied to the one or more secondary storage devices: determining whether the specific file is different from a previous version of the specific file stored in the one or more secondary storage devices; and in response to determining that the specific files is different from the previous version of the specific file, identifying the specific file as a file to be synchronized.

According to yet another embodiment, a system for providing access to files stored at one or more remote secondary storage devices is disclosed, the system comprising: a data store; and a synchronization module executing in computer hardware comprising one or more computer processors and configured to: access user-defined synchronization criteria for identifying files to synchronize between a first primary storage device associated with a first client computing device and a second primary storage device associated with a second client computing device; initiate a secondary copy operation in which one or more files stored in the first primary storage device are copied to one or more secondary storage devices to create a secondary copy including the one or more files; after the initiation of the secondary copy operation, and based on the user-defined synchronization criteria, identify, by the synchronization module, at least one file in the secondary copy to synchronize between the first primary storage device and the second primary storage device; after communicating a listing of the at least one file to the second client computing device, initiate, by the synchronization module, synchronization of the at least one file to the second client computing device; and in response to receiving a request from the second client computing device for a particular file, and where the request is received after said initiating synchronization of the at least one file to the second client computing device and prior to completion of the synchronization of a particular file to the second client computing device: complete the synchronization of the particular file to the second client computing device by causing communication of a copy of the particular file to the second client computing device.

According to an aspect, the at least one file that is synchronized to the second client computing device is accessed from the one or more secondary storage devices.

According to an aspect, the identification of the at least one file is performed in response to the secondary copy operation.

According to another embodiment, a networked data storage system is disclosed comprising: a first client computing device; a second client computing device; at least one first primary storage device associated with the first client computing device; at least one second primary storage device associated with the second client computing device; one or more secondary storage devices; and computer hardware comprising one or more computer processors and having a synchronization module executing thereon, the synchronization module configured to: access user-defined synchronization criteria for identifying files to synchronize between a first primary storage device associated with a first client computing device and a second primary storage device associated with a second client computing device; initiate a secondary copy operation in which one or more files stored in the first primary storage device are copied to one or more secondary storage devices to create a secondary copy including the one or more files; after the initiation of the secondary copy operation, and based on the user-defined synchronization criteria, identify, by the synchronization module, at least one file in the secondary copy to synchronize between the first primary storage device and the second primary storage device; after communicating a listing of the at least one file to the second client computing device, initiate, by the synchronization module, synchronization of the at least one file to the second client computing device; and in response to receiving a request from the second client computing device for a particular file, and where the request is received after said initiating synchronization of the at least one file to the second client computing device and prior to completion of the synchronization of a particular file to the second client computing device: complete the synchronization of the particular file to the second client computing device by causing communication of a copy of the particular file to the second client computing device.

According to an aspect, the at least one file that is synchronized to the second client computing device is accessed from the one or more secondary storage devices.

According to an aspect, the identification of the at least one file is performed in response to the secondary copy operation.

BRIEF DESCRIPTION OF THE DRAWINGS

FIGS. 7A-G illustrate exemplary screenshots of pages of a user interface of a data synchronization management system, according to various embodiments of the present disclosure.

DETAILED DESCRIPTION

Systems and methods are described herein for synchronizing files or other data. For instance, techniques are described for synchronizing files between multiple client computing devices in a data storage system. The synchronization can be in response to, or otherwise in conjunction with, backup or other secondary copy operations. The data synchronization components and techniques may be incorporated within, implemented by, or otherwise compatible with information management systems such as those that will now be described with respect to FIGS. 1A-1E. Data synchronization is described in further detail with respect to FIGS. 2-7G.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Figure 1A:
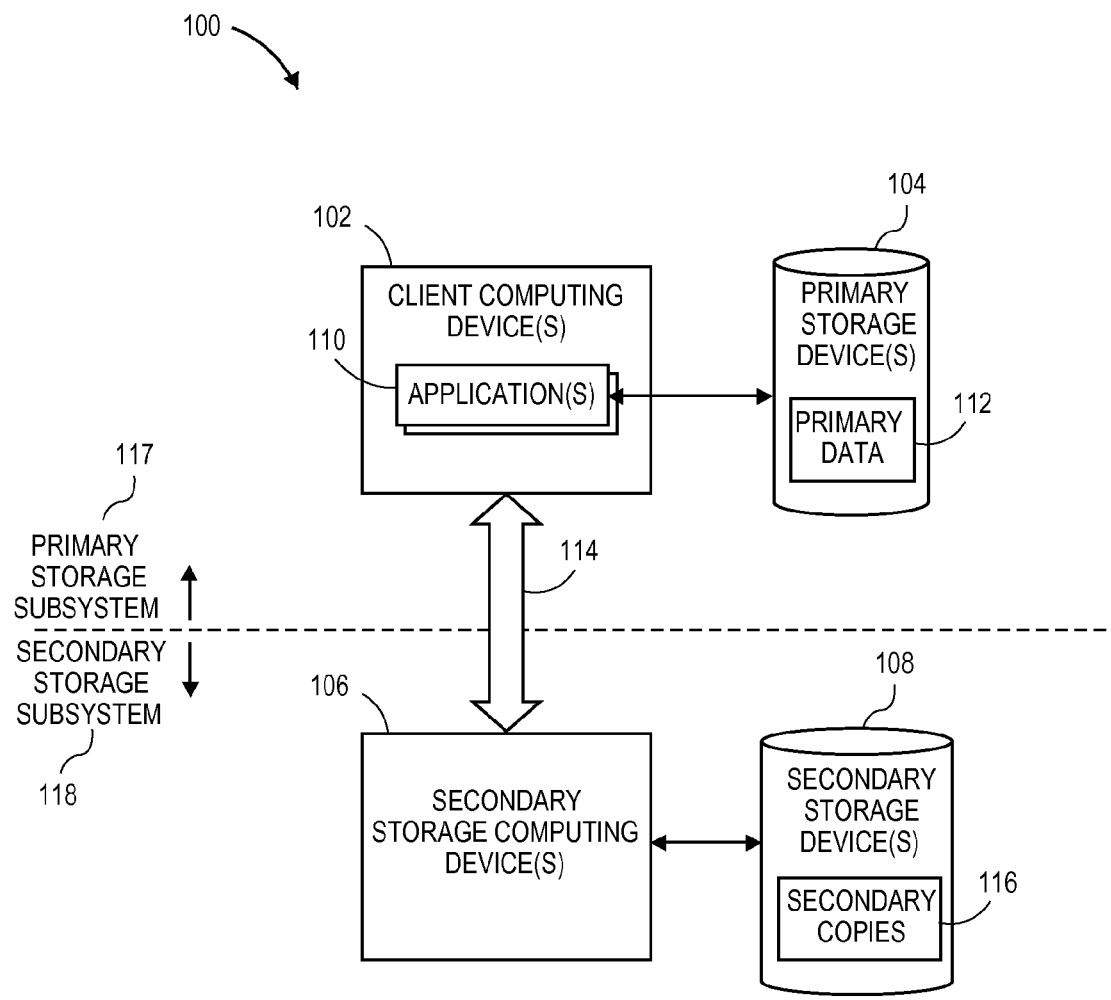
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. Pub. No. 2010-0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";

U.S. Pat. No. 7,035,880, entitled "MODULAR BACKUP AND RETRIEVAL SYSTEM USED IN CONJUNCTION WITH A STORAGE AREA NETWORK";

U.S. Pat. No. 7,343,453, entitled "HIERARCHICAL SYSTEMS AND METHODS FOR PROVIDING A UNIFIED VIEW OF STORAGE INFORMATION";

U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. Pub. No. 2012/0084269, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0329534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPS), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

Figure 1B:
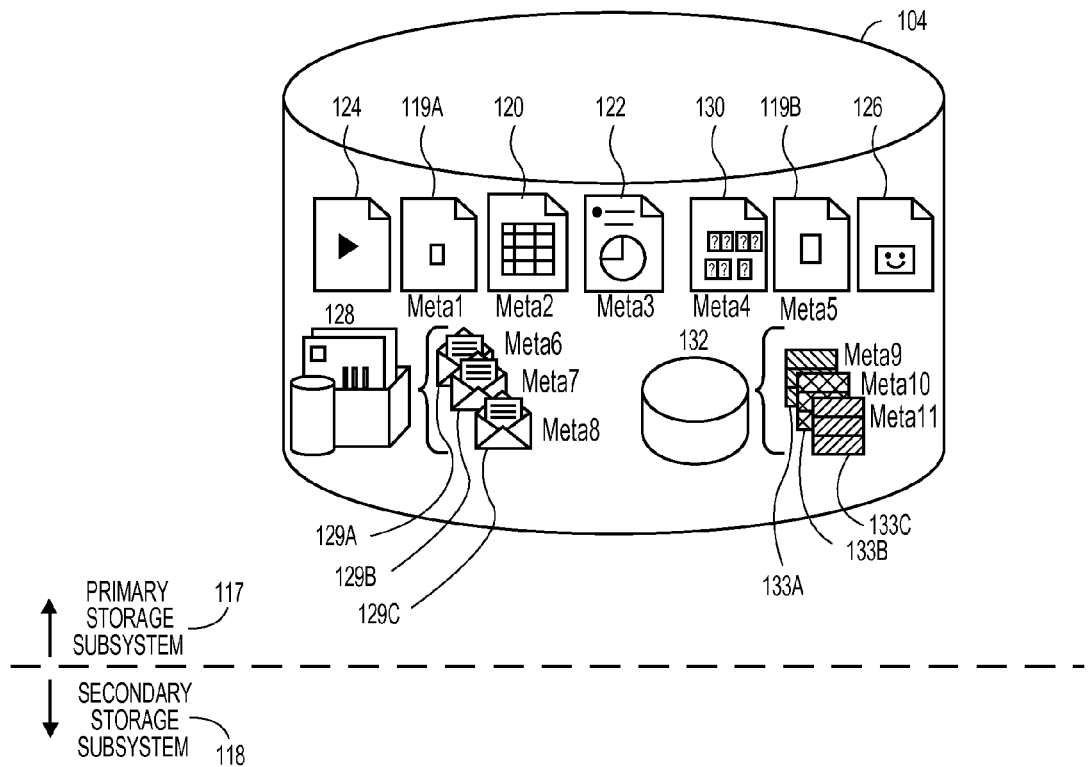
FIG. 1B is a detailed view of a primary storage device, a secondary storage device, and some examples of primary data and secondary copy data.
Figure 1B:
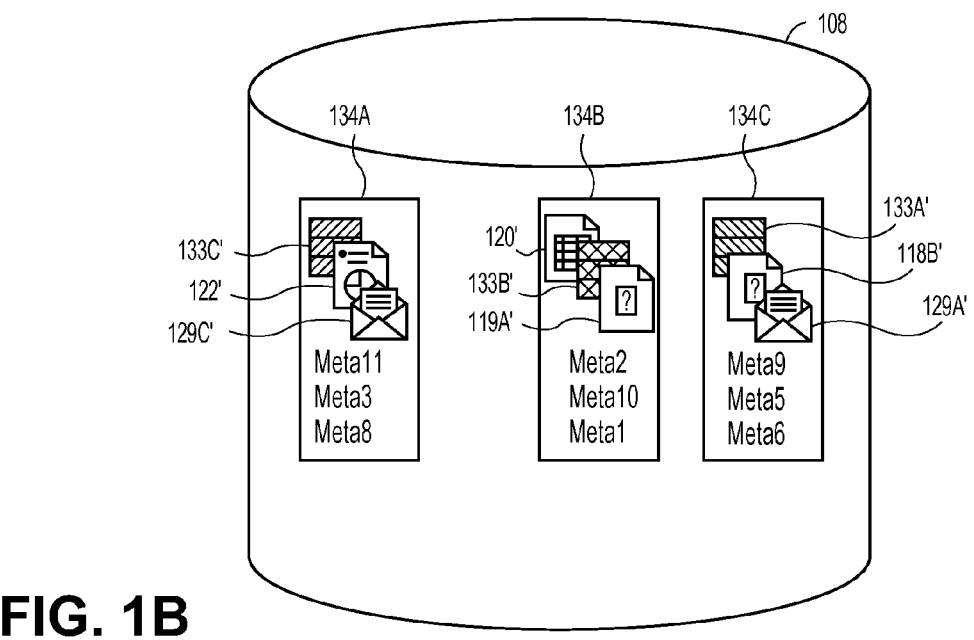

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Meta1-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
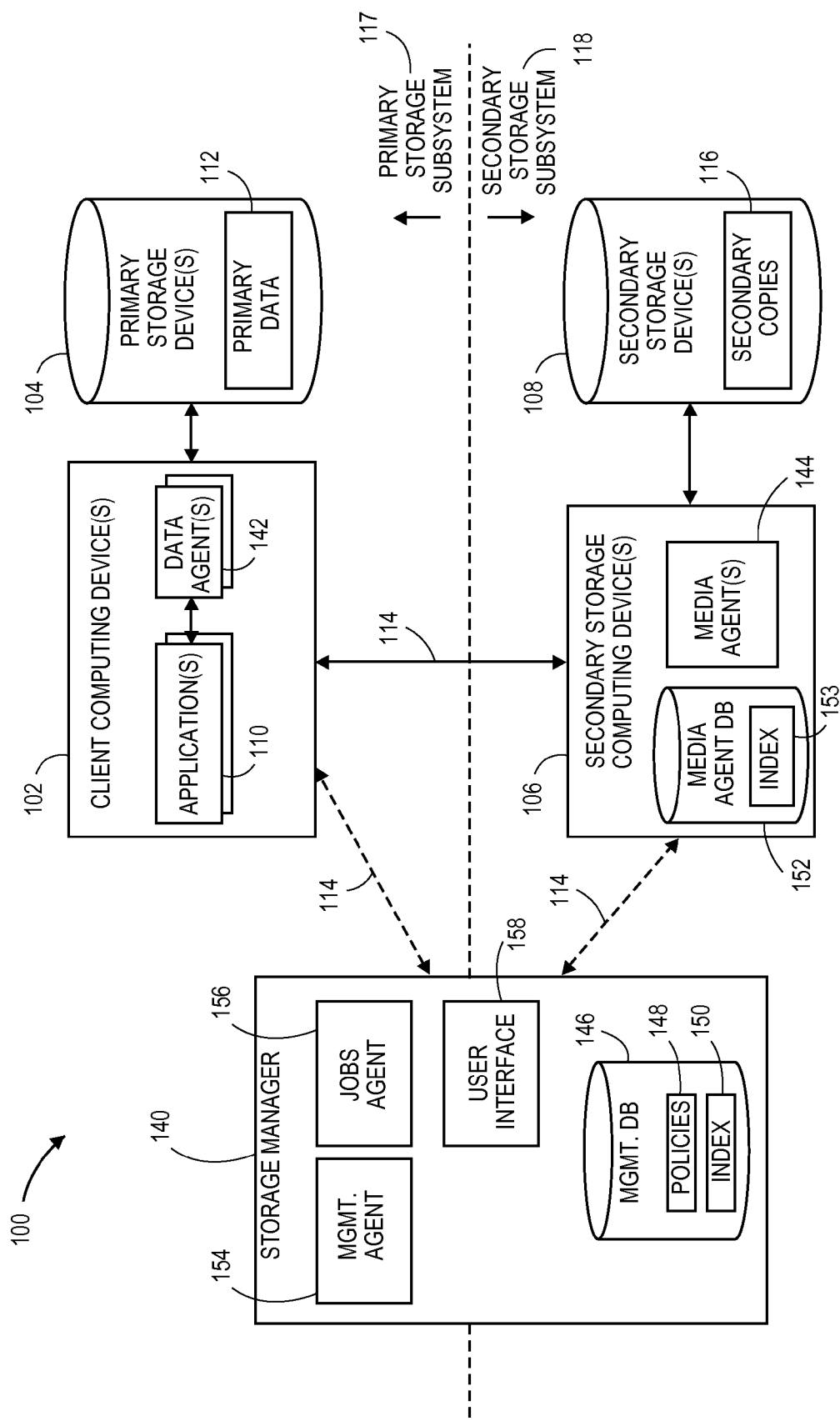
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
- initiating execution of secondary copy operations;
- managing secondary storage devices 108 and inventory/capacity of the same;
- allocating secondary storage devices 108 for secondary storage operations;
- monitoring completion of and providing status reporting related to secondary storage operations;
- tracking age information relating to secondary copies 116, secondary storage devices 108, and comparing the age information against retention guidelines;
- tracking movement of data within the information management system 100;
- tracking logical associations between components in the information management system 100;
- protecting metadata associated with the information management system 100; and
- implementing operations management functionality;

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
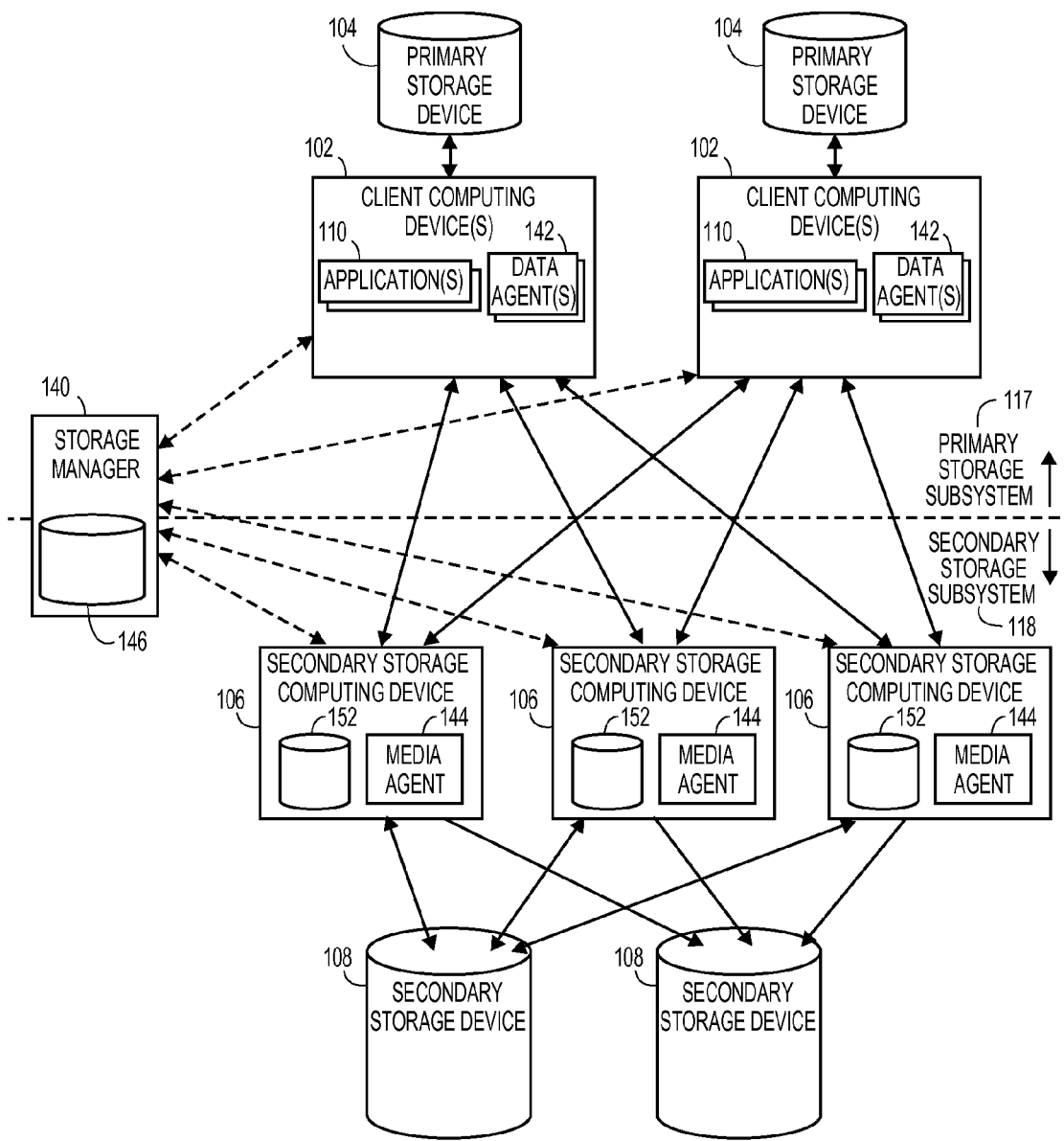
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups. Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. Pub. No. 2012/0084269, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

schedules or other timing information, e.g., specifying when and/or how often to perform information management operations;

the type of secondary copy 116 and/or secondary copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation between different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Storage Operations

Figure 1E:
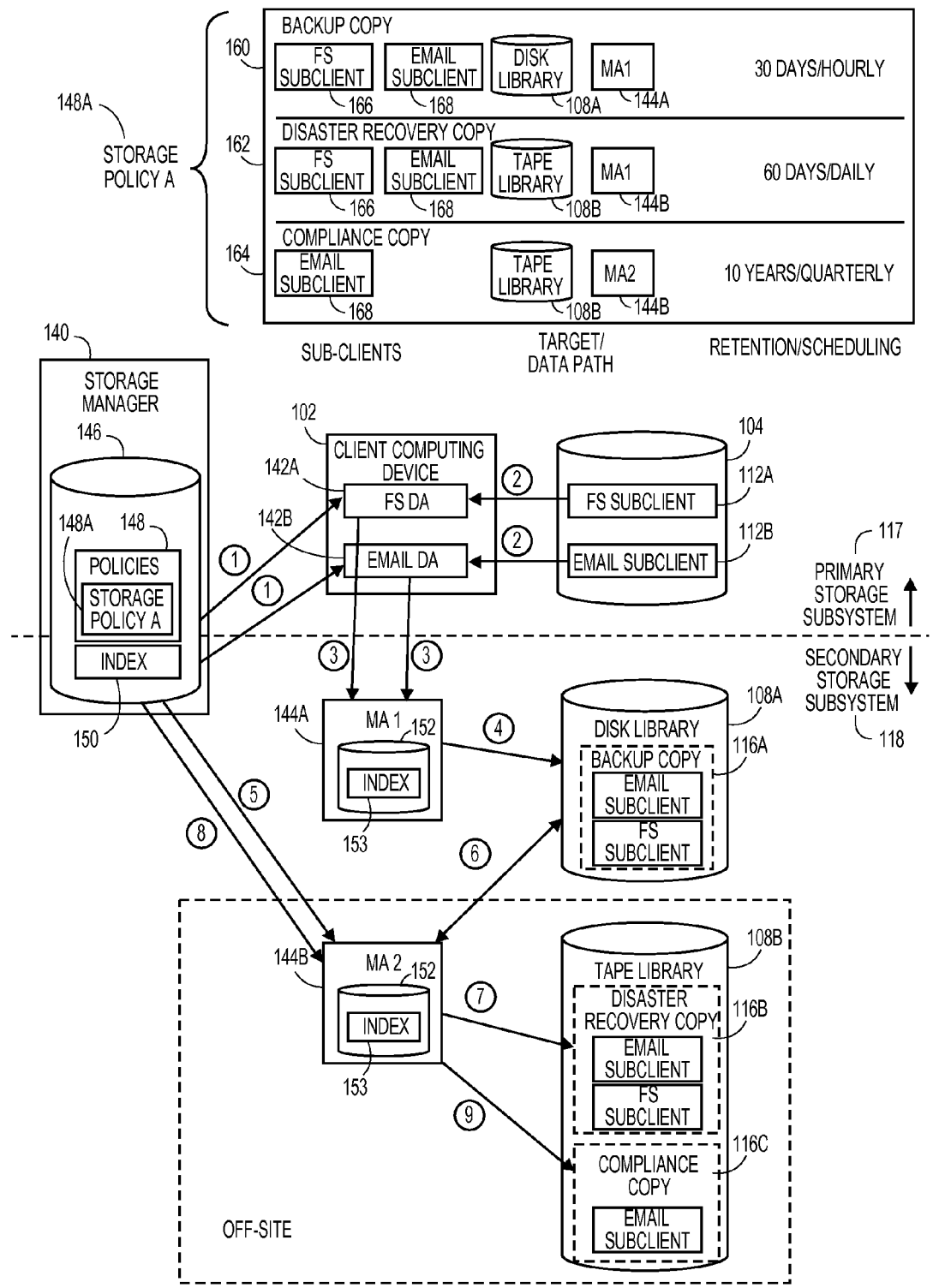
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers 300 can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

Data Synchronization Management System

Figure 2:
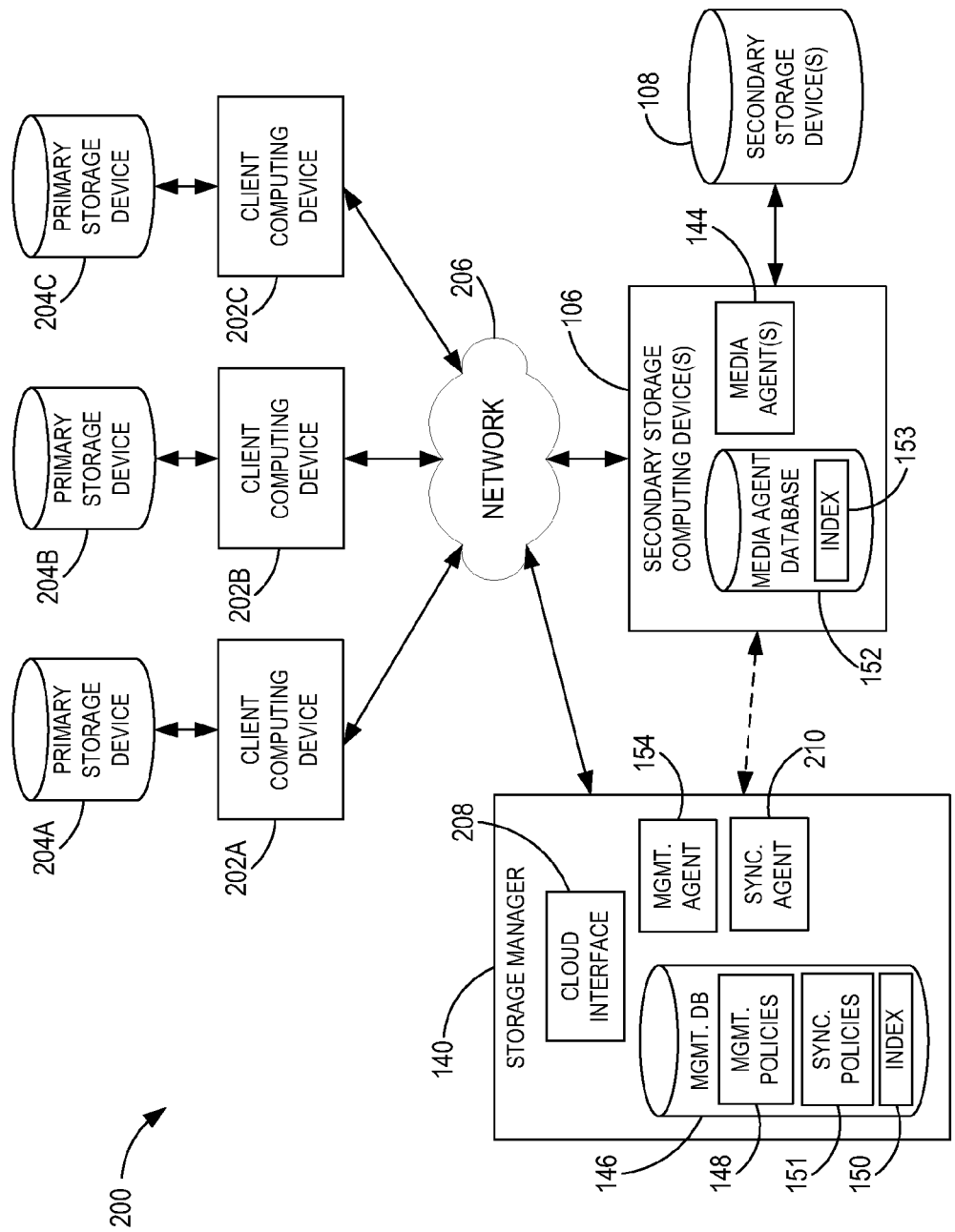
FIG. 2 is a block diagram illustrating an exemplary information management system configured to implement synchronization management, according to an embodiment of the present disclosure.

FIG. 2 illustrates a data synchronization management system 200 according to an embodiment of the present disclosure. The data synchronization management system 200 can incorporate a variety of different hardware and software components, which can in turn be organized with respect to one another in many different configurations, depending on the embodiment.

The data synchronization management system 200 of FIG. 2 includes the storage manager 140, the secondary storage computing device(s) 106, the secondary storage device(s) 108, client computing devices 202A-C, and primary storage devices 204A-C. As described above, the storage manager 140 includes the management database 146 and the management agent 154. Additionally, the storage manager 140 includes a cloud interface 208 and a synchronization agent 210. The management database 146 includes information management policies 148, synchronization policies 151, and the management index 150, as described above. The secondary storage computing device(s) 106 include media agent(s) 144 and the media agent database 152, the media agent database 152 also including the index 153.

The client computing devices 202A-C each may communicate with the respective primary storage devices 204A-C. While three client computing devices 202A-C and three primary storage devices 204A-C are shown for illustrative purposes in FIG. 2, additional (or fewer) client computing devices and primary storage devices may be present in the data synchronization management system 200. Certain components in the system may communicate with one another via a network 206. For instance, each of the client computing devices 202A-C may communicate with the network 206. Similarly, the storage manager 140 and the secondary storage computing device(s) 106 may communicate with the network 206. Thus, through the network 206 each of the client computing devices 202A-C, the storage manager 140, and the secondary storage computing device(s) 106 may communicate with one-another. The network 206 may comprise any wired and/or wireless communications network suitable for data communications, and may include any of the networks, communications link, or communications pathways described herein. For example, the network 206 may comprise one or more of a LAN, WAN, cellular data network and/or the Internet, among others. Additionally, communication over the network 206 may be accomplished through any suitable communications protocol. For example, communication may be serial or parallel, through Universal Serial Bus (USB) (wired or wireless), Ethernet, Bluetooth, Near Field Communications (NFC), radio frequency (RF), infrared, and/or WiFi (such as any 802.1x interface), or combinations thereof, among others. As shown by the dotted line in FIG. 2, the storage manager 140 and the secondary storage computing device(s) 106 may also optionally communicate with one another directly, instead of or in addition to communicating with one another via the network 206, also through any suitable communications network or protocol.

Storage Manager in the Data Synchronization Management System

In general, in the data synchronization management system 200 the storage manager 140 may include all of the functionality and components described above in reference to FIGS. 1A-E. In addition, according to certain embodiments of the data synchronization management system 200, the storage manager 140 provides (among others) one or more of the following functions:
  tracking synchronization information related to primary copies of data on the primary storage devices 204A-C, and secondary copies of data on the secondary storage device(s) 108;
  tracking and resolving conflicts between similar pieces of data located in the various storage devices;
  managing user created data synchronization policies; and
  providing direct access to data stored in secondary storage device(s) 108 through a cloud interface.

As described above, the storage manager 140 may maintain a database 146 of management-related data, such as information management and synchronization policies. The database 146 may include the management index 150 or other data structure that stores logical associations between components of the system, user preferences, synchronization polices and/or synchronization (and/or user) profiles (e.g., preferences regarding what data is synchronized to which devices, preferences regarding the scheduling, type, or other aspects of data synchronization operations, etc.), management tasks, synchronization tasks, or other useful data. For example, the storage manager 140 may use the index 150 to track logical associations between media agents 144 and secondary storage devices 108, movement of data from primary storage devices 204A-C to secondary storage device(s) 108, and/or synchronization states of data among the primary storage devices 204A-C.

Thus, the data synchronization management system 200 may utilize information management policies 148 for specifying and executing information management operations, and synchronization policies 151 for specifying and executing synchronization operations (e.g., on an automated basis). Generally, an information management policy 148 can include a data structure or other information source that specifies a set of parameters (e.g., criteria and rules) associated with storage and/or other information management operations. Similarly, a synchronization policy 151 can include a data structure or other information source that specifies a set of parameters (e.g., criteria and rules) associated with synchronization operations.

According to certain embodiments, a synchronization policy 151 generally comprises a logical container that defines (or includes information sufficient to determine) one or more of the following items: (1) what data will be associated with the synchronization policy; (2) source information associated with the data to be synchronized, such as such as the identity of primary storage device(s) 204 and/or client computing device(s) 202 storing or otherwise associated with the data, information indicating where the data is stored (e.g., primary storage address information), and the like; (4) destination information associated with the data, such as the identify of secondary storage device(s), secondary storage devices 106, and/or media agents to which the data will be synchronized; (5) datapath information specifying how the data will be communicated from sources to destinations; (6) the type of synchronization operation to be performed; and (7) the synchronization schedule. For example, a synchronization policy may be created by a user of the data synchronization management system 200, in which the user specifies that files and/or data to be synchronized (by specifying for inclusion, for example, files belonging to a particular directory, files having particular content, and/or files having particular associated file metadata) and the devices to which the data will be synchronized (for example, a user may specify that data and/or files associated with client computing device 202A are to be synchronized to the primary storage device 204B associated with the client computing device 202B).

In general, in the data synchronization management system 200, a user may be identified by a user profile. The user profile associated with a user may include, for example, information management policies 148 and/or synchronization policies 151 of the user, an identification of the user (for example, a username), and/or a means of authenticating the identity of the user (for example, a password), among other things. Information management policies 148 and/or synchronization policies 151 may be associated with particular users of the data synchronization management system 200, and more than one information management policy 148 and/or synchronization policy 151 may be associated with a particular user. In general, synchronization polices 151 in the data synchronization management system 200 are associated with a user profile. The user profile may also include other information relevant to the data synchronization management system 200, including for example, backup policies, among other things.

In the storage manager 140, the management agent 154, synchronization agent 210, and cloud interface 208, may be implemented as interconnected software modules or application programs.

The synchronization agent 210 in some embodiments initiates, controls, and/or monitors the status of some or all synchronization or other information management operations previously performed, currently being performed, or scheduled to be performed by the data synchronization management system 200. For instance, the synchronization agent 210 may access information management policies 148 to determine when and how to initiate and control synchronization and other information management operations, as will be described further below. Although not depicted in FIG. 2, embodiments of the data synchronization management system 200 generally also include the jobs agent 156 in the storage manager 140, as described above with respect to the information management system 100. Thus, information management operations may be initiated, controlled, and/or monitored by the jobs agent 156 and/or the synchronization agent 210. In an embodiment, the jobs agent 156 and the synchronization agent 210 may be a single unit.

The cloud interface 208 may include information processing and display software, such as a graphical user interface ("GUI"), an application program interface ("API"), or other interactive interface or portal through which users and system processes may retrieve information about the status of synchronization and/or other information management operations and data (e.g., storage operations and storage locations), retrieve data and/or files directly, view file lists, and/or issue instructions to the data synchronization management system 200 and its constituent components. For instance, a user may access the cloud interface 208 via a browser or other application executing on one of the client computing devices 202 or another computing device.

Via the cloud interface 208, users may optionally issue instructions to the components in the data synchronization management system 200 regarding performance of storage and recovery operations, performance of synchronization operations, and/or accessing of stored data. For example, a user may modify a synchronization schedule or may employ the GUI to view the status of pending storage and/or synchronization operations, or to monitor the status of certain components in the data synchronization management system 200. As another example, a user may identify and authenticate themselves (with, for example, a username and password), and view and access files and data (stored in, for example, the secondary storage device(s) 108) associated with the user. Data from the cloud interface 208 may be transferred over the network 206. For example, the cloud interface 208 may be accessed by a user over the Internet. As with the other components of the data synchronization management system 200, in other embodiments the cloud interface 208 may be located in a different part of the system (for example, in the secondary storage computing device(s) 106).

Data and/or files may be transferred from the client computing devices 202A-C to the secondary storage device(s) via the media agent(s) 144 (and associated secondary storage computing device(s) 106). Thus, for example, during a secondary copy operation, files may be backed up or otherwise transferred from the primary storage device 204A to the secondary storage device(s) 108. During synchronization, the media agent(s) 144, at the direction of the storage manager 140, may communicate the files to be synchronized (e.g., through a restore operation) from the secondary storage device(s) 108 to the destination client computing device(s) 202 for storage in the associated primary storage devices 204.

In another embodiment, data and/or files transferred in the data synchronization management system 200 may be transferred directly from one client computing device to another. Such a transfer may be under the direction of the storage manager 140. For example, storage manager 140 may direct client computing device 202A to transfer files to be synchronized directly to computing device 202B, e.g., without the use of the media agent(s) 144. Alternatively, the client computing devices 202 may include the components necessary to identify files to be synchronized, and to transfer those files to associated client computing devices directly. In this alternative, the storage manager 140 may snoop on the files transferred from one client computing device to another so as to identify files to be copied to secondary storage.

Other Components in the Data Synchronization Management System

As described above with respect to the information management system 100, the client computing devices 202A-C include application(s) 110 and data agent(s) 142 (although they are not depicted in FIG. 2). These application(s) 110 and data agent(s) 142 generally function as described above. Additionally, it is to be understood that primary storage devices 204A-C store primary data, as described above. Similarly, the secondary storage computing device(s) 106 (including the media agent 144, media agent database 152, and index 153) and the secondary storage device(s) 108 also generally function as described above in the information management system 100.

In particular, in the data synchronization management system 200, information management, information processing, information transfer, data movement, secondary copy, and data backup, archive, and other operations in general are carried out in a manner similar to that described above. Thus, it is to be understood that the description of the data synchronization management system 200 includes all of the functionality described above with respect to those and other operations, components, and characteristics (such as scalability).

Exemplary Data Synchronization Management Operations and Processes

Figure 3:
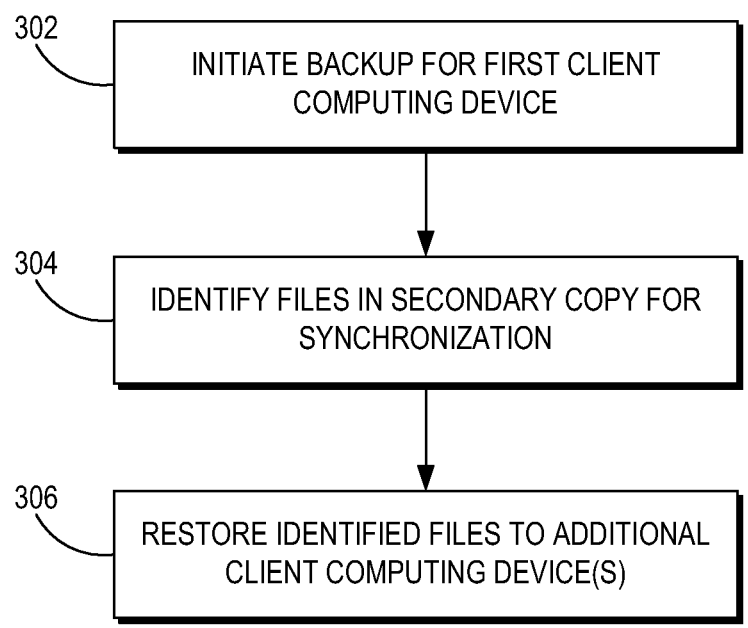
FIG. 3 illustrates an example data synchronization management process, according to an embodiment of the present disclosure.

FIG. 3 illustrates an example data synchronization management process, according to an embodiment of the present disclosure. In general, according to certain embodiments, a data synchronization operation occurs as a result of or in response to a secondary copy operation (e.g., a data backup operation). The data synchronization may occur subsequent to, simultaneously with, or may at least partially overlap with the secondary copy operation, depending on the embodiment. While data synchronization operations may be described herein as occurring in conjunction with backup operations for the purposes of illustration, data synchronization operations may be compatible with other types of secondary copy operations in addition to backup operations, e.g., archive operations, snapshot operations, replication operations, etc.

In an embodiment, a secondary copy operation occurs in which a copy of primary data stored in one of the primary storage devices 204A-C is created in the secondary storage device(s) 108. Then, particular identified files are synchronized (e.g., through a restore operation) to the other primary storage devices 204A-C from the secondary storage device(s) 108. This process is described in detail in reference to blocks 302, 304, and 306 below.

At block 302, a backup operation is initiated for a first client computing device. For example, an information management policy 148 may specify that a backup of certain data associated with client computing device 202A is to occur. and the storage manager 140 may therefore initiate the backup. Alternatively, a user of the client computing device 202A may arbitrarily choose to manually initiate a backup, e.g., using the GUI of the storage manager 140. The data and/or file backup operation generally proceeds as detailed above (for example, as described in reference to FIG. 1E). For example, the files selected for backup by the information management policy 148 may be copied from primary storage device 204A to secondary storage device(s) 108, as directed by the storage manager 140.

At block 304, files in the secondary copy (for example, files backed up in the secondary storage device(s) 108) are identified for synchronization. Files and/or data to be synchronized are specified by the synchronization policy 151, which can be any of those described above. Additionally, the storage manager 140 and/or the media agent(s) 144 compare the files backed up as part of the current backup operation to the previous versions of the files located in the secondary storage device(s) 108.

Files that have not changed (e.g., no changes in file contents and/or metadata) are determined to not require synchronization. Files that have changed in some way, however, are determined to require synchronization. For example, the user of the data synchronization management system 200 may specify that files contained within a particular directory are to be synchronized. Those files specified in the synchronization policy by the user will then be compared to previous versions of those files stored in the secondary storage device(s) 108, and files requiring synchronization will be identified by, for example, the storage manager 140 and/or media agent(s) 144. In various embodiments, the files to be synchronized may be identified before the backup is initiated, as the backup is initiated, as the backup is in progress, and/or after the backup is completed. Further details regarding the designation and identification of the files to be synchronized are described in reference to FIG. 4 below.

At block 306, those files that are identified to be synchronized are restored to specific client computing devices. In general, the data and/or file restore operation proceeds as detailed above (for example, as described in reference to FIG. 1E). For example, files may be transferred from the secondary storage device(s) 108 to one or more of the primary storage devices 204A-C. User created synchronization policies may specify the specific files to be synchronized, and/or the specific devices to which those files are to be synchronized. For example, the user may specify that files in a particular directory on the client computing device 202A are to be synchronized with a particular directory on the client computing device 202B. Thus, in an embodiment, the file synchronization among client computing devices (such as client computing devices 202A-C) may be accomplished through a combination of operations similar to the backup and restore operations described above.

In an embodiment, identified files may not be restored/synchronized from the secondary storage device(s) 108, but rather may be transferred from one client computing device to another directly. Thus, although the files to be synchronized may be backed up to the secondary storage device(s) 108, and the backup operation may trigger the synchronization process, the synchronization is performed by transferring the files from the source client computing device to the target client computing device. Thus, the bandwidth of the secondary storage computing device(s) 106's connection to the network 206 may advantageously be preserved.

In certain embodiments, the user may specify multiple synchronization policies. For example, the user may specify that files located in directory "alpha" associated with client computing device 202A are to be synchronized with a version of directory "alpha" associated with client computing device 202B, while the files in directory "beta" associated with client computing device 202B are to be synchronized with a version of directory "beta" associated with client computing device 202C. Further, in certain embodiments, the user may specify different directories on the client computing devices to be synchronized. For example, the user may specify that files located in directory "alpha" associated with client computing device 202A are to be synchronized with directory "gamma" associated with client computing device 202B. Additionally, in certain embodiments, the user may synchronize files and/or data among more than two client computing devices. For example, the user may specify the particular client computing devices to which files are to be synchronized. Alternatively, files may be synchronized to all client computing devices associated with the user of the data synchronization management system 200. Client computing devices associated with the user may be identified, in some embodiments, through the user profile. For example, a user may associate themselves with all the client computing devices they own and/or manage by including the identities of those client computing devices in the user's user profile.

Figure 4:
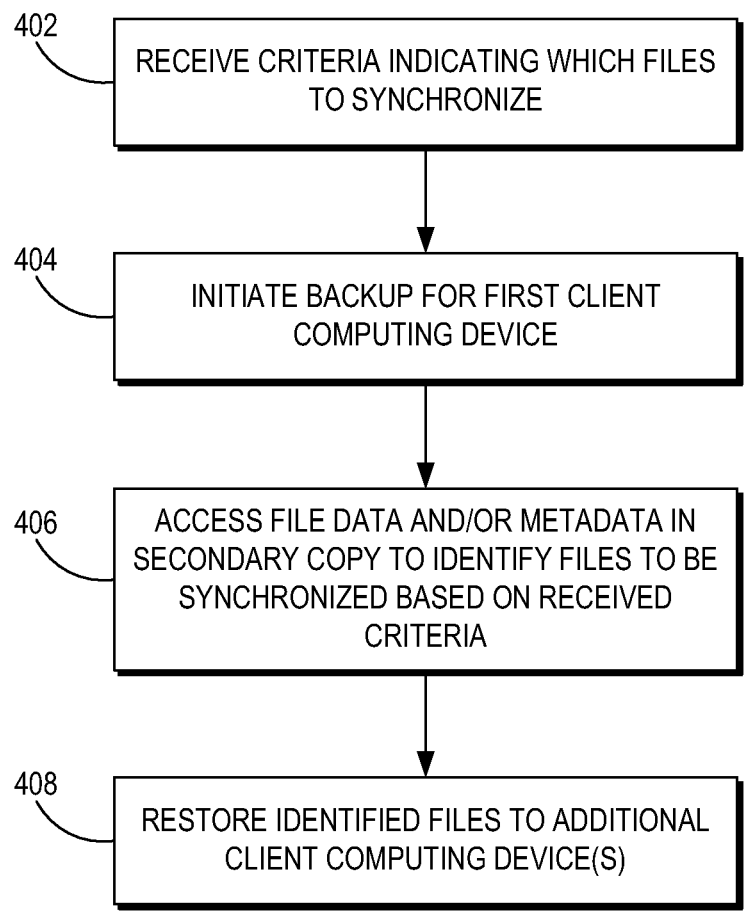
FIG. 4 illustrates an example data synchronization management process including designation of particular files, according to an embodiment of the present disclosure.

FIG. 4 illustrates an example data synchronization management process including designation of particular files, according to an embodiment of the present disclosure. At block 402, the data synchronization management system 200 receives parameters indicating which files and/or data to synchronize. In some embodiments, the user indicates and/or identifies the files, and/or criteria for identifying the files, to be synchronized. In some embodiments, the files and/or data to be synchronized may be identified according to some policy, and/or a policy may be automatically created when a new user profile is created and/or a user profile is associated with a particular client computing device (for example, certain types of files, such as photos, may be automatically selected for synchronization when a user profile is created).

A user may specify the files to be synchronized. Files to be synchronized may be directly selected or otherwise identified, or user-defined criteria may be specified to indirectly identify the files to be synchronized. For instance, without limitation, files may be identified by detecting the existence of specified content within the file (such as the existence of one or more specified terms within a document), and/or by matching metadata associated with the file with one or more specified metadata parameters (such as filename, file owner, directory, creation date, modification date, size, type, location, Global Positioning System (GPS) coordinates, among others). The criteria used to identify files to be synchronized may vary. In addition, more than one criteria may be specified to identify files to be synchronized. For example, files to be synchronized may be identified as the files in a certain directory that were created after a certain date.

At block 404, a backup operation is initiated for a first client computing device, similar to the operation of block 302 of FIG. 3. The files to be backed up may be specified by a backup policy, and may include files other than and/or in addition to those files selected for synchronization. In an embodiment, the files designated to be synchronized are automatically included in a backup policy. In another embodiment, the backup policy and the synchronization policy are separate, but may be related in some way. The backup schedule set by the backup policy may or may not be linked to or associated with the synchronization schedule. In an embodiment, the synchronization policy is a subset of the backup policy. In an embodiment, multiple synchronization policies and backup policies may exist and/or be associated with a user profile. In an embodiment, files to be synchronized according to a synchronization policy are synchronized anytime any scheduled backup occurs (and/or is manually initiated).

At block 406, the recently created backup copy is processed to identify files to be synchronized based on the received parameters discussed above in relation to block 402. For instance, the media agent 144 accesses the secondary copy from the secondary storage device(s) 108 and process the secondary copy to identify the files for synchronization. Similar to block 304 of FIG. 3, in block 406 the files to be synchronized are thus identified. Thus, for example, when the synchronization policy specifies files in directory "delta" are to be synchronized, at block 406 the files in the secondary storage device(s) 108 that are in the designated directory "delta" (i.e., that satisfy the synchronization criteria specified by the policy) and are identified as having changed will be identified for synchronization.

At block 408, those files that are identified to be synchronized are restored or otherwise transmitted to the target client computing devices, as described above in relation to the operation of block 306 of FIG. 3.

As described above, in an embodiment, identified files may not be restored/synchronized from the secondary storage device(s) 108, but rather may be transferred from one client computing device to another directly. In this embodiment the source client computing device may identify the files to be synchronized and communicate the files to the target client computing device(s).

Figure 5:
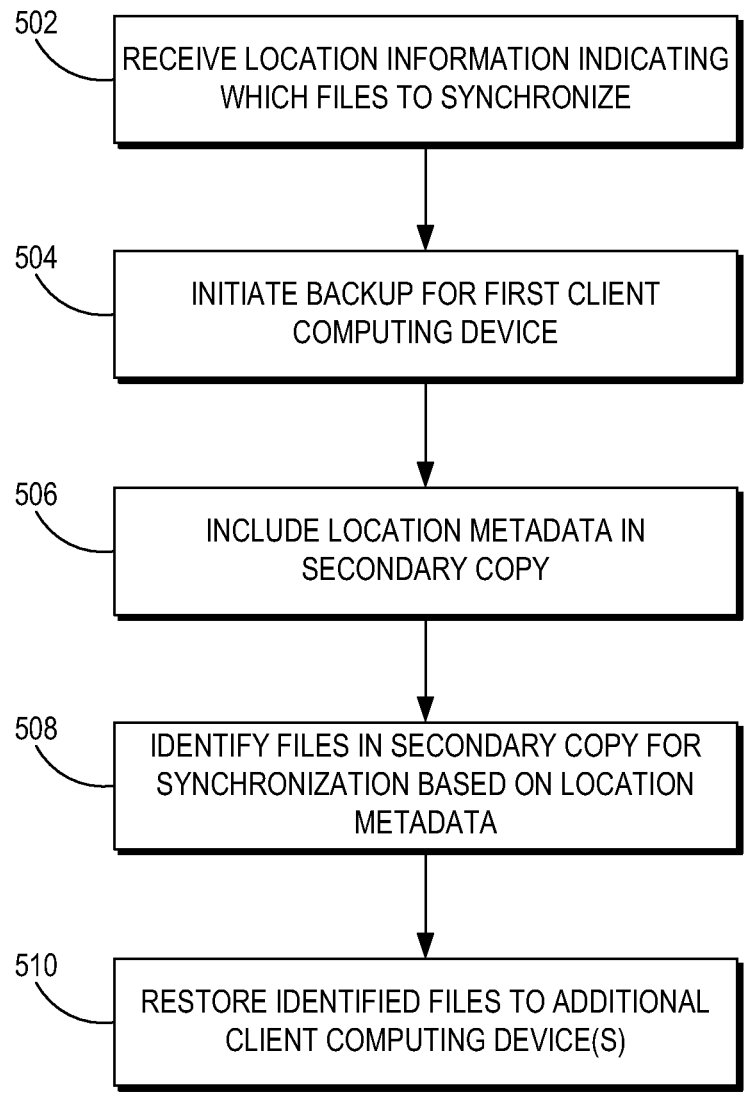
FIG. 5 illustrates an example data synchronization management process including location metadata, according to an embodiment of the present disclosure.

FIG. 5 illustrates an example data synchronization management process including location metadata, according to an embodiment of the present disclosure. At block 502, the data synchronization management system 200 receives location information indicating which files and/or data to synchronize. In some embodiments, the user indicates and/or identifies the files to be synchronized based on the location information. In some embodiments, the files and/or data to be synchronized based on location information may be identified according to some policy, and/or may be automatically created when a new user profile is created and/or a user profile is associated with a particular client computing device (for example, certain files created in a particular location, such as documents created at home, may be automatically selected for synchronization when a user profile is created).

Location information may include, for example, geographical location, personal location (such as, for example, home or work), GPS location, city, and/or state, just to name a few. A user may provide the location information in addition to other parameters as described above in reference to block 402 of FIG. 4.

At block 504, a backup operation is initiated for a first client computing device, similar to the operation of block 302 of FIG. 3, and 404 of FIG. 4.

At block 506, location metadata may be included and/or added to files in the secondary copy. In some embodiments, a component of the data synchronization management system 200 adds location information (such as, GPS coordinates) to the metadata associated with files on the client computing devices 202A-C, in the primary copy. For example, in an embodiment, data agents on the client computing devices 202A-C may add location metadata to files at the point the files are created, accessed, modified, and/or designated in some other way (such as, for example, designated through a backup and/or synchronization policy). In other embodiments, the storage manager 140 or other appropriate component may store location information related to client computing devices 202A-C, and add location metadata to files backed up (or otherwise transferred to secondary storage). For example, the storage manager 140 may direct data agents on the client computing devices 202A-C to add location metadata to files when a scheduled backup operation occurs.

Location information may include, for example, GPS coordinates, an Internet Protocol (IP) address, a street address, a geographic location (such as a city, state, etc.), a triangulated location based on mobile tracking with respect to telecommunications base stations, and/or computer-enabled location-based services, among others. Location information may be provided by the client computing device. Location information may also be provided by a device attached to, embedded in, or otherwise in communication with the client computing device. For example, location information may be provided by a GPS receiver, a network adapter, or a cellular network radio, among others. Alternatively, location information may be provided manually by a user. For example, a user may specify location information for one or more files, and/or may designate location information associated with a particular client computing device. In an embodiment, any combination of the above described ways of providing location information may be used.

At block 508, file location metadata is accessed in the secondary copy (in, for example, the secondary storage device(s) 108). The accessed location metadata can then be used to identify files to be synchronized, according to the synchronization policy. For example, the user profile may include a synchronization policy that includes synchronization of all files that are created at the user's home GPS coordinates. Thus, identified files in the secondary copy may include those with GPS metadata indicating a location associated with, at, or near the user's home.

At block 510, those files that are identified to be synchronized are restored to the appropriate computing devices, as described above in relation to the operation of block 306 of FIG. 3.

As described above, in an embodiment, identified files may not be restored/synchronized from the secondary storage device(s) 108, but rather may be transferred from one client computing device to another directly. In this embodiment, location metadata may be accessed on the client computing device to identify the files to be synchronized directly to other client computing devices.

Remote File Access Operations and Processes

Figure 6:
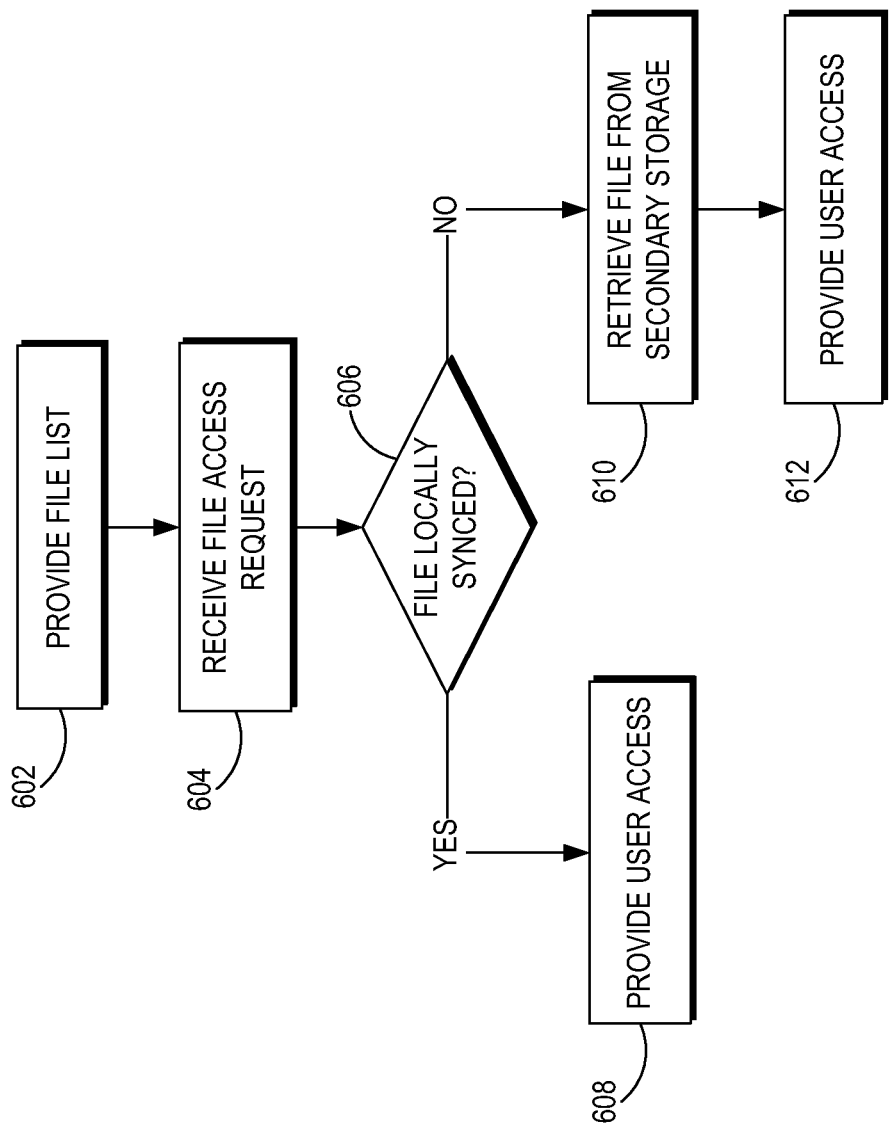
FIG. 6 illustrates an example remote file access process, according to an embodiment of the present disclosure.

FIG. 6 illustrates an example remote file access process, according to an embodiment of the present disclosure. In some instances, a user of the data synchronization management system 200, through one of the client computing devices 202A-C, may request access to a file that may or may not presently be stored on the one of the client computing devices 202A-C. A file may not be present on one of the client computing devices 202A-C in certain circumstances including circumstances in which, for example, the user is attempting to access the file through the cloud interface 208 and/or the file data has not yet been synchronized to the particular client computing device. For example, in certain embodiments a user may utilize a client computing device to view, through the cloud interface 208, a list of files designated for synchronization. The list of files designated for synchronization may include files not presently synchronized to the client computing device. For example, a file that was recently created on another client computing device may not yet be synchronized to the user's client computing device. A user attempting to access files through the cloud interface 208 may thus attempt to access files that are not yet synchronized to the user's client computing device. Alternatively, an earlier version of the file desired by the user may be present on the user's client computing device, whereas an updated version has not yet synchronized from another client computing device where it was recently updated.

In an embodiment, the data synchronization management system 200 may not synchronize all designated files to all client computing devices, but rather may synchronize a file list including, for example, file names and locations, but not the actual file data. In this embodiment, file data associated with a particular file may be synchronized to a client computing device at the time of a user's request for that file on that client computing device. In another embodiment, the data synchronization management system 200 may initially synchronize a file list, and subsequently synchronize the file data in the background. In an embodiment, the user may access a file list from any network 206 connected device, such as laptop computer with a web browser or the like.

Thus, the user may be able to view a list of files, even though the actual file data may not be present on the network 206 connected device.

The example remote file access process begins at block 602, at which point a file list is provided to, for example, a user. The file list may be provided to the user in any of the examples and embodiments described above. The file list may include limited file information, for example, file names, file locations, file modification dates, and/or file sizes, among other things.

At block 604, a file access request is received from the user. For example, a user of the primary storage device 204B or a web browser may view the file list, and see a file that they would like to access. The user may then request access to that file by, for example, clicking on or otherwise selecting the file.

Once the file access request is received, at block 606 the data synchronization management system 200 determines whether the file is locally synchronized. This may be accomplished, for example, by a local data agent and/or the storage manager 140. In an embodiment in which the user is attempting to access the file through a web browser and the cloud interface 208, it may be determined whether the requested file is stored in a local cache. In some embodiments, the file may be synchronizing in the background, and/or the locally synchronized file may be a version older than the most recent on all synchronized devices.

In the event the current version of the requested file is locally synchronized, at block 608 the user is provided access to that local file. In the event the current version of the requested file is not locally synced, at block 610 the current version of the file is retrieved/synchronized from secondary storage. In another embodiment, the file may be retrieved directly from another client computing device, also as described above with respect to synchronization operations.

Once the requested file is transferred to the user's device, at block 612, the user is provided access to that local copy of the file.

In an embodiment, the user may optionally manually initiate synchronization of an accessed file. For example, when the user has edited the accessed file, the user may optionally manually initiate the transfer of the edited file back to the secondary storage device(s) 108. The edited file may then be synchronized to all related devices according to the synchronization policy.

The user profile may include synchronization policies specifying those files that are accessible through the remote file access process, as well as those that are not. For example, the user may specify that only particular files and/or data are to be available through the cloud interface 208. The user may likely specify that all synchronized files, or no synchronized files are to be available through the cloud interface 208.

File Conflicts

It may occur during the operation of the data synchronization management system 200 that file conflicts and/or inconsistencies arise. For example, the same file may be edited simultaneously in two of the client computing devices 202A-C. In this event, each file may be synchronized to the other client computing device, creating a conflict. In an embodiment, this conflict may be resolved in an automated fashion. For certain file types, the differences may be merged according to any appropriate method. In some instances, one or more of the conflicting files may be renamed, and the user notified of the conflict for manual resolution. In general, even conflicted files will continue to be synchronized and backed up according to applicable policies.

Other Embodiments

In an embodiment, one or more media agent(s) 144 may manage the synchronization of data and/or files among the client computing devices 202A-C. The media agent(s) 144 may determine whether changes have been made to backed up files that are designated for synchronization, and thus may determine whether or not a synchronization/restore operation occurs with respect to the other client computing device.

In various embodiments, a synchronization policy may include the options for two-way synchronization and/or one-way synchronization. In two-way synchronization, files and/or data may be synchronized both to and from a destination. For example, a synchronization policy may indicate that files should be two-way synchronized between client computing device 202A and client computing device 202B. Thus, any changes on either of the devices would be synchronized to the other device. Alternatively, a synchronization policy may indicate that files should be one-way synchronized. For example, one-way synchronization from client computing device 202A to client computing device 202B would cause any changes to synchronized files on client computing device 202A to be synchronized to client computing device 202B, but not the other way around. Alternatively, a reverse one-way synchronization would cause any changes on client computing device 202B to be synchronized to client computing device 202A, but not the other way around.

In an embodiment, when a client computing device that is part of a synchronization policy is offline (for example, it is not connected to the network 206, or it is powered down), the data synchronization management system 200 will wait until that client computing device comes back online to synchronize files and data to that client computing device. This may be accomplished, for example, through a polling process in which the storage manager 140 (or other component of the data synchronization management system 200) periodically polls the client computing devices 202A-C to determine whether they are connected to the network 206. Alternatively, the client computing devices 202A-C may periodically send notification to the storage manager 140 (or other component of the data synchronization management system 200) when they are connected to the network 206. In an embodiment, the connectedness of the client computing device is not determined until a scheduled or forced backup and/or synchronization occurs. In another embodiment, the client computing devices 202A-C send notification to the storage manager 140 (or other component of the data synchronization management system 200) when they are initially connected to the network 206.

In an embodiment, all data transferred within the data synchronization management system 200 is encrypted. The encrypted data may then be unencrypted when the user is identified and the identity of the user is authenticated. Additionally, in an embodiment, the data associated with the data synchronization management system 200 does not leave the ecosystem of the data synchronization management system 200. For example, the data synchronization management system 200 may comprise a local area network and/or enterprise network in which all communications are authenticated and encrypted. Thus, no unencrypted data is transferred out of the information management system to, for example, the open internet. Further, various data associated with various user profiles may be kept entirely separate (for example, encrypted separately).

In an embodiment, data and files in the data synchronization management system 200 are deduplicated at the file and/or block level. Thus, a file stored in secondary storage device(s) 108 is only stored once, even though it may be synchronized across multiple client computing devices, and although each of those client computing devices may have a separate backup policy involving that file.

It is to be understood that the various embodiments of the data synchronization management system 200 described may include any or all of the various components of the information management system 100 described above, including, but not limited to, data movement operations, backup operations, archive operations, snapshot operations, replication operations, deduplication operations, data processing and manipulations operations, content indexing, metabase classification operations, encryption operations, and/or management operations.

User Interface Screenshots

FIGS. 7A-G illustrate exemplary screenshots of pages of the user interface of the data synchronization management system 200, according to various embodiments of the present disclosure. In FIGS. 7A-G, the term 'cloud folder' may be understood to refer to, without limitation, synchronization policies as described in the present disclosure.

Figure 7A:
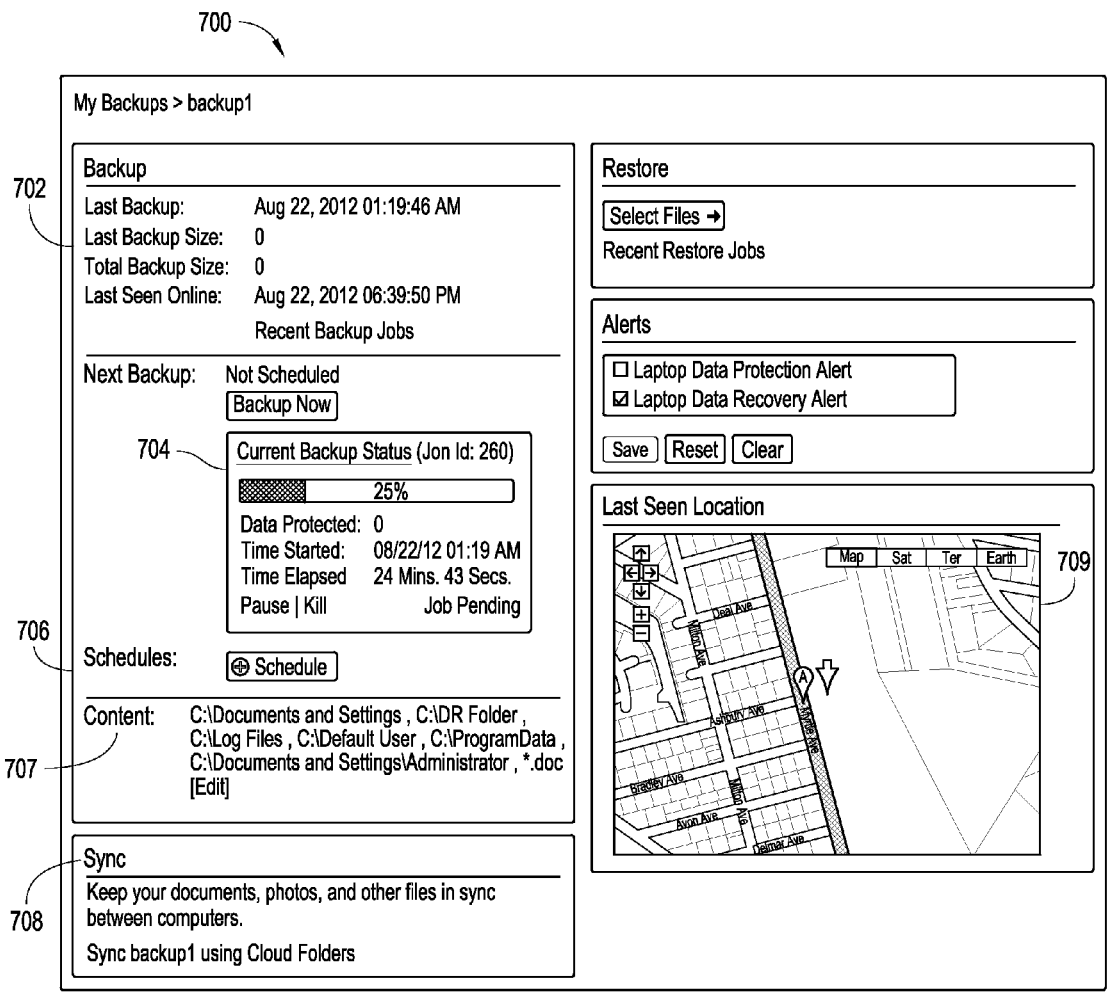

Screenshot 700 of FIG. 7A shows an exemplary page of a user interface of the data synchronization management system 200 including a listing of backup information 702, a current backup status display 704, a listing of backup schedules 706, a listing of content 707, synchronization information 708, and a last seen location window 709. In screenshot 700, user "backup1" has implemented a backup policy on a client computing device. The listing of backup information 702 includes the date and time of the last backup, the last backup size, the total backup size, and the date and time this client computing device was last seen online. The current backup status display 704 indicates that there is a current backup in process, and no backups are scheduled. The backup schedules 706 button allows the user may schedule backups. The listing of content 707 field indicates directories that the user has specified for back up. The synchronization information 708 field allows the user to set synchronization policies by clicking the "Sync backup1 using Cloud Folders" link. The last seen location window 709 shows the client computing devices last seen location. The last seen location window 709 indicates that the client computing device associated with user interface of screenshot 700 includes a means of gathering location data that may be associated files to be backed up and/or synchronized.

Figure 7B:
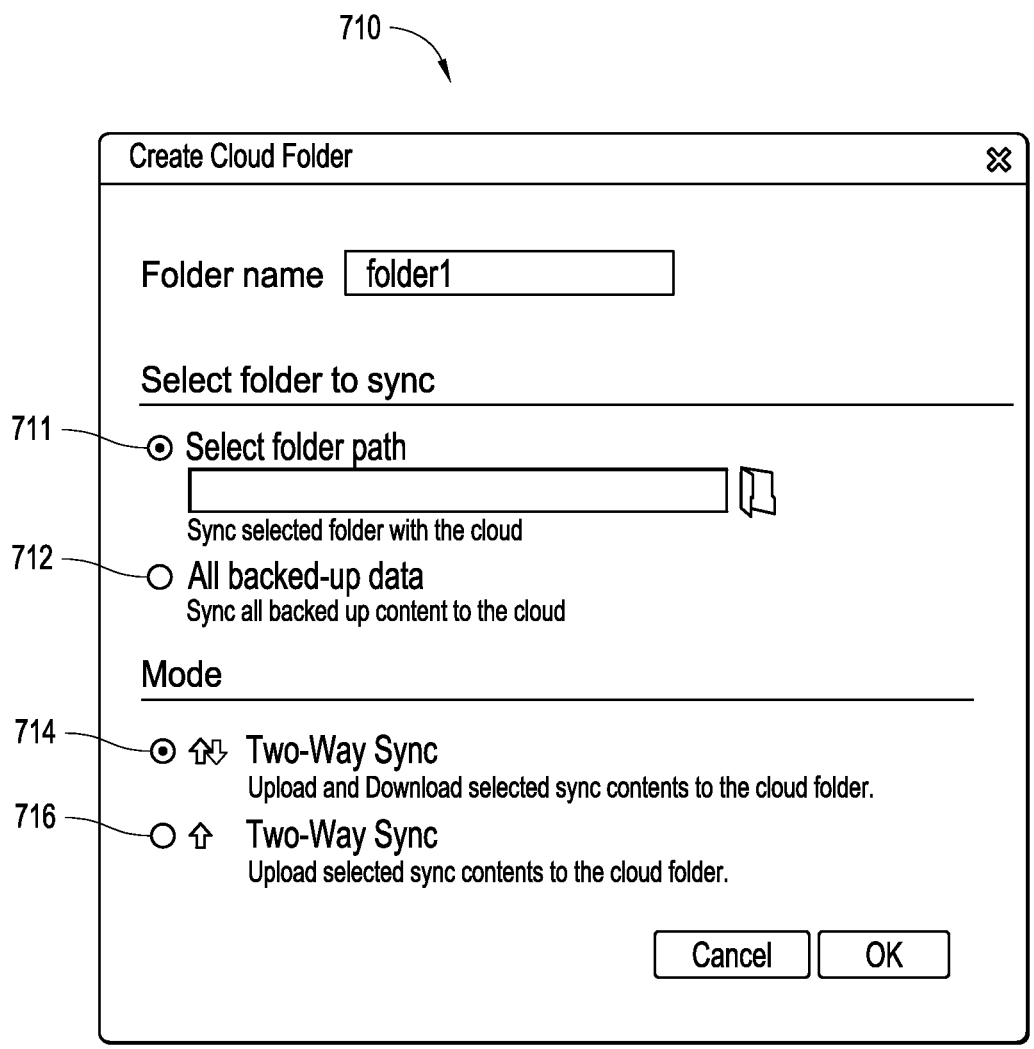

The screenshot 710 of FIG. 7B shows an exemplary page of the user interface when a user chooses to create a synchronization policy, including a select folder path radio button 711, an all backed-up data radio button 712, a two-way sync radio button 714, and one-way sync to cloud folder radio button 716. In screenshot 710, the user has specified a folder/synchronize policy name, "folder1." Using the select folder path radio button 711, the user may choose particular folders/directories to synchronize. By selecting the all backed-up data radio button 712, the user may choose to synchronize all data that is already part of the backup policy. Using the two-way sync radio button 714, the user may choose to synchronize file changes both ways (i.e., file changes on this client computing device are synchronized to other client computing devices, and likewise changes on other client computing devices are synchronized to this client computing device). Alternatively, the user may use the one-way sync to cloud folder radio button 716 to synchronize files one way (i.e., file changes on this client computing device are synchronized to other client computing devices, but not the other way around).

Figure 7C:
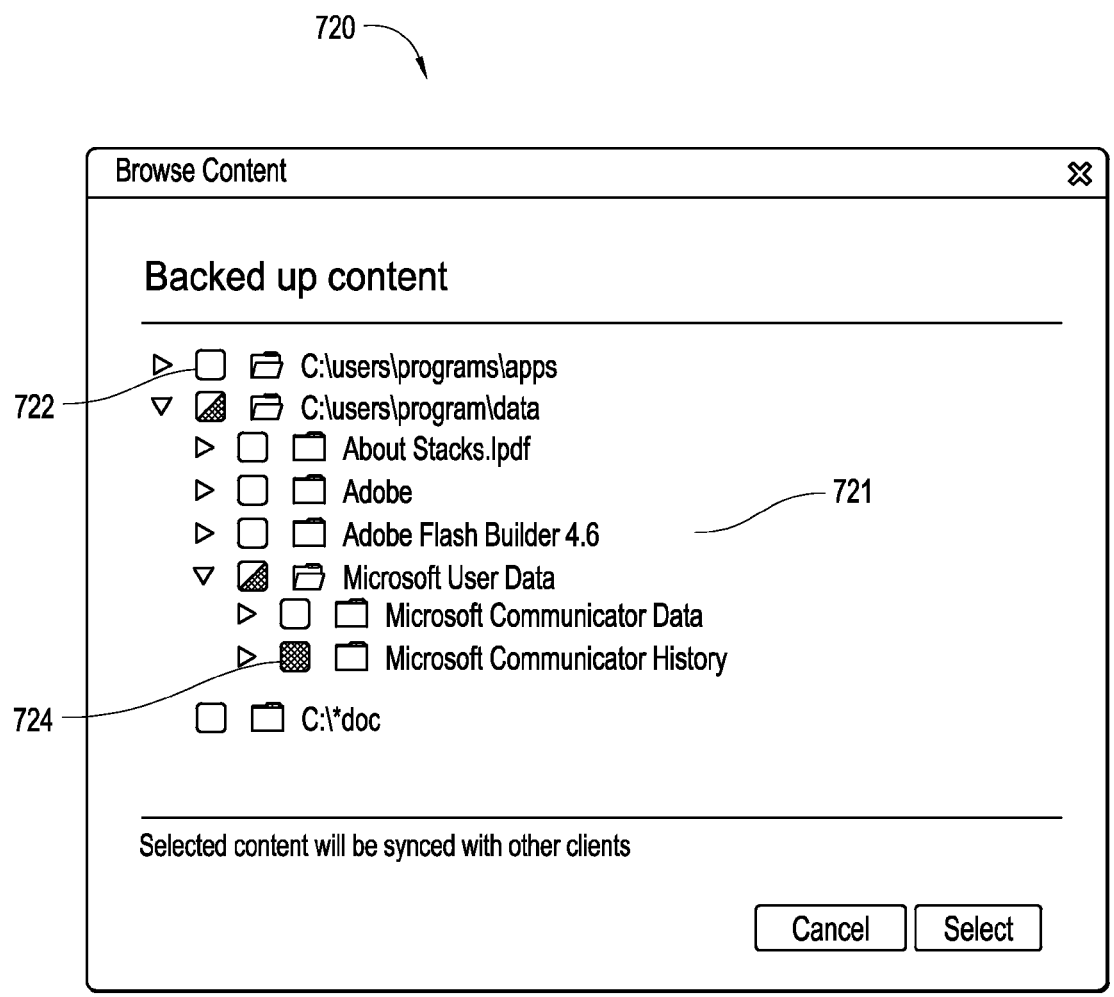

Screenshot 720 of FIG. 7C shows another exemplary page of the user interface when a user chooses the select folder path radio button 711 of the page shown in FIG. 7B. The page includes a listing 721 of backed up content. The listing 721 includes a deselected folder 722 and a selected folder 724. The listing shows directories that will be synchronized under the present synchronization policy. The deselected folder 722 is a folder/directory that is not selected for synchronization. The selected folder 724 is a folder/directory that is selected for synchronization.

Screenshot 730 of FIG. 7D shows an exemplary page of the user interface after a synchronization policy/cloud folder "folder1" has been created, as indicated by field 732.

Figure 7E:
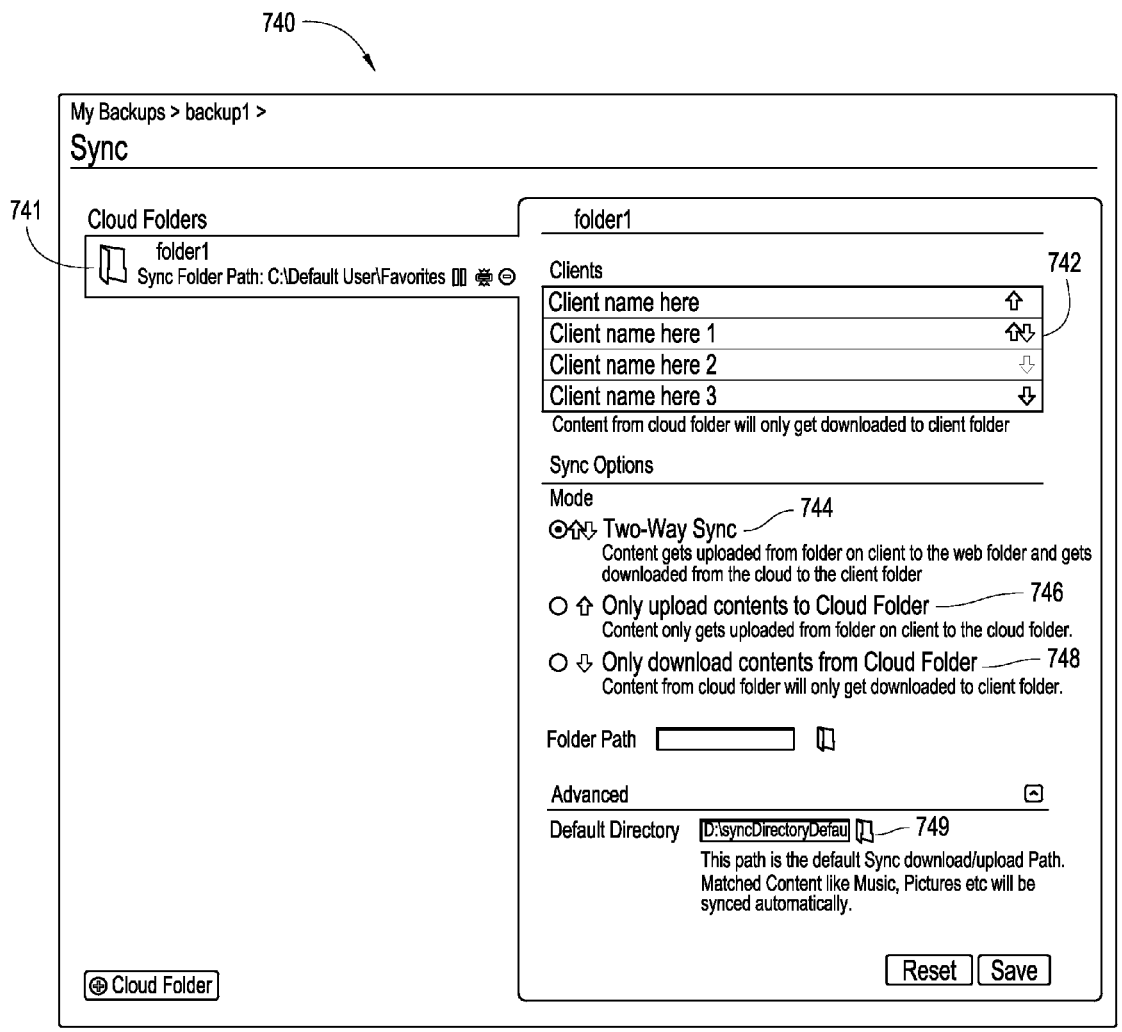

Screenshot 740 of FIG. 7E shows another exemplary page of the user interface in which synchronization policies may be set. The page includes a listing of cloud folders including folder1 information tab 741, a listing of synchronization clients 742, a listing of sync options including two-way sync mode 744, only upload contents to cloud folder sync mode 746, and only download contents to cloud folder sync mode 748, and a default directory field 749. Folder1 information tab 741 indicates the current synchronization policy that is being set, as well as the directory path that is being synchronized. The listing of synchronization clients 742 indicates the destinations to which the files of the current synchronization policy will be synchronized. For each of the four listed synchronization clients 742, the user may select a synchronization mode from the listing of sync options. The modes include: two-way sync mode 744 (synchronization both to and from the destination/client), only upload contents to cloud folder sync mode 746 (only synchronize to the destination/client), and only download contents to cloud folder sync mode 748 (only synchronize from the destination/client). At default directory 749 the user may set the path of the default download/upload path.

Figure 7F:
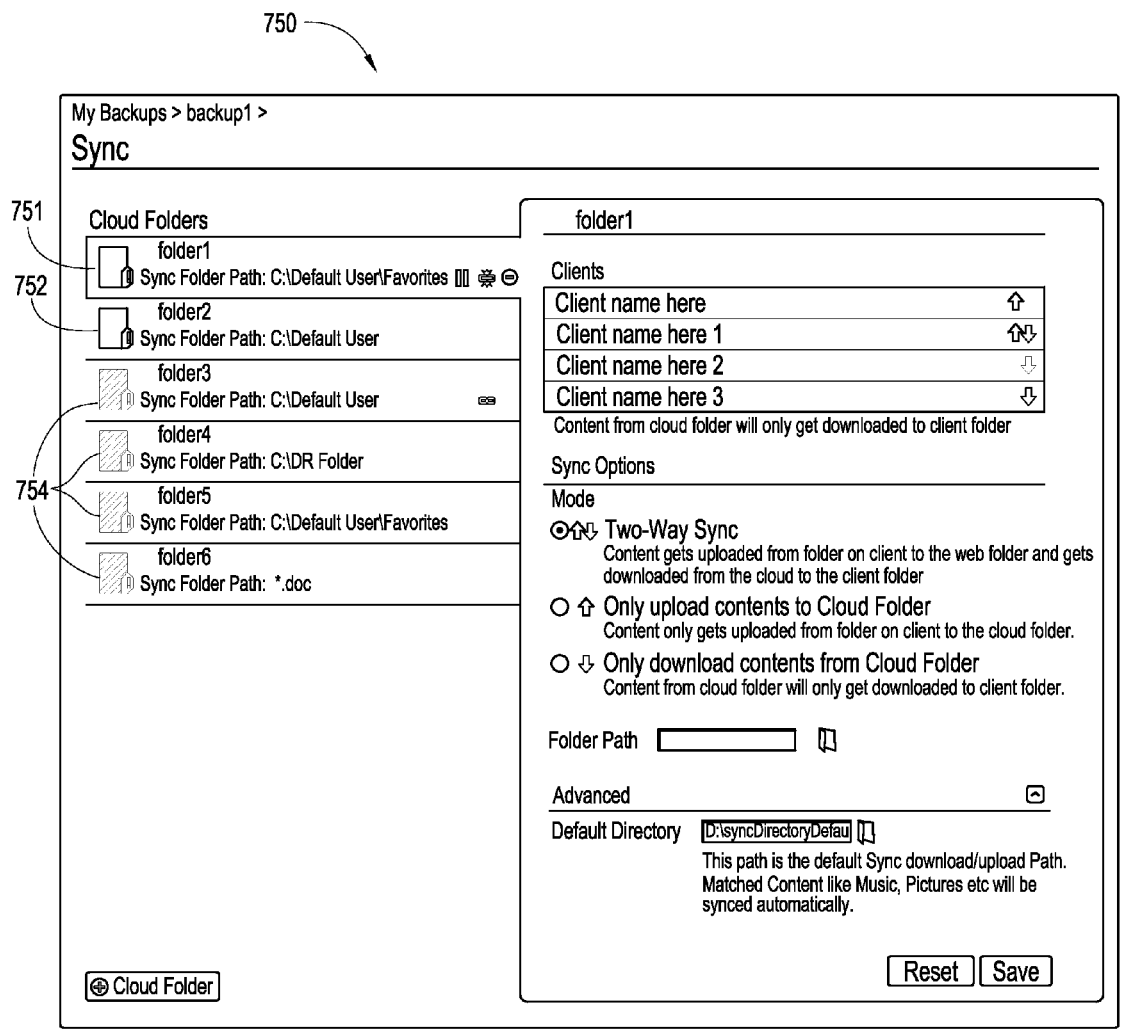

Screenshot 750 of FIG. 7F shows yet another exemplary page of user interface in which synchronization policies may be set. The page includes two highlighted active cloud folders, indicated by the highlighted folder1 information tab 751 and folder2 information tab 752. The page also includes four inactive cloud folders, indicated by the greyed out folder information tabs 754. Active cloud folders may include those in which files are currently synchronizing, file synchronization is currently paused, and/or a synchronization schedule is set. Conversely, inactive cloud folders may include those in which files are not currently synchronizing, file synchronization is not currently paused, and/or a synchronization schedule is not set. As shown, multiple synchronization policies (cloud folders) may be set. In screenshot 750, folder1 information tab 751 and folder2 information tab 752 indicate folders that are currently active, while folder information tabs 754 indicate those that are currently inactive.

Figure 7G:
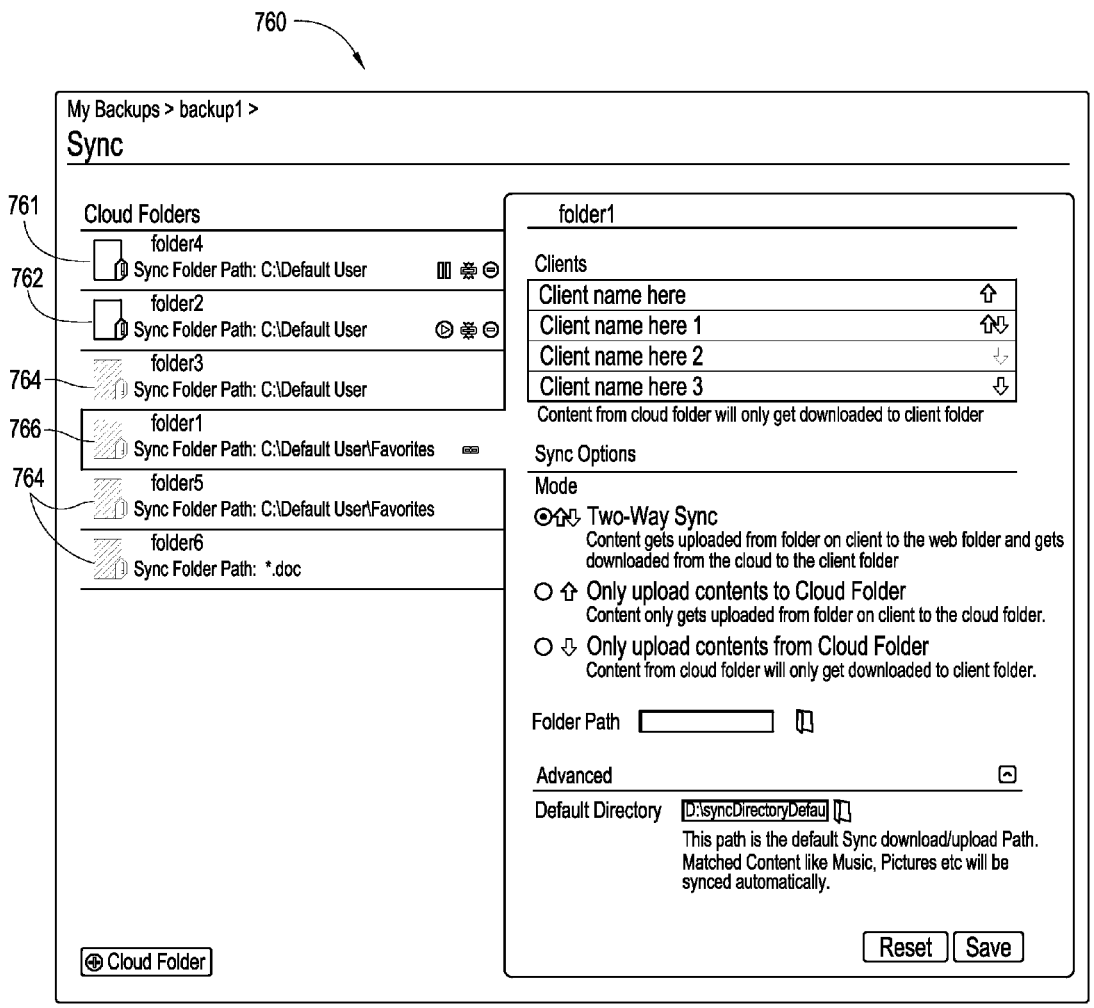

Screenshot 760 of FIG. 7G shows an exemplary page of the user interface in which synchronization policies may be set. The page includes active cloud folders folder4 and folder 2, indicated by information tabs 761 and 762. The page also includes inactive cloud folders folder 3, folder5, and folder6 indicated by information tab 764. Further, the page includes inactive cloud folder folder1 indicated by information tab 766. Folder4 (indicated by information tab 761) is active and currently synchronizing, while folder2 (indicated by information tab 762) is currently paused (not synchronizing). Formerly active (as shown in the page of screenshot 750), folder1 is now inactive, as indicated by information tab 766.

Thus, the data synchronization management system 200 advantageously enables synchronization of files and/or data among various client computing devices simultaneously with backups of files and/or data. Advantageously, various synchronization policies may be set and adjusted by a user, specifying files to be synchronized based on parameters (file data, contents, and/or metadata) such as, for example, file location, file type, file size, file creation and/or modification, and/or location information. Additionally, synchronization policies may specify the devices to which various files should be synchronized. Further, the data synchronization management system 200 advantageously enables a user to access synchronized files through a cloud interface 208 from any location.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A computer-implemented method of providing access to files stored at one or more remote backup storage devices, the computer-implemented method comprising:
  initiating, by a storage manager, a backup operation, the backup operation comprising:
    identifying, according to a storage policy, one or more original files stored in a first primary storage device associated with a first client computing device; and
    copying, according to a backup schedule specified by the storage policy, the one or more original files stored in the first primary storage device to one or more remote backup storage devices to create one or more backup files that correspond to the one or more original files;
  receiving, at a second client computing device, a listing of the one or more backup files, wherein the one or more backup files are designated to be synchronized to the second client computing device from the first client computing device, wherein each of the first client computing device and the second client computing device are in communication with the one or more remote backup storage devices that store backup copies of data associated with the first client computing device and the second client computing device according to the storage policy;

initiating, by a synchronization agent executing on computer hardware comprising one or more computer processors, a background process to communicate the one or more backup files from the one or more remote backup storage devices to the second client computing device to synchronize the one or more backup files to the second client computing device; and in response to a request for a particular file of the one or more backup files, wherein the request is entered by a user via interaction with the second client computing device, and wherein the request is received after said initiating the background process to communicate the one or more backup files to the second client computing device and prior to completion of communication of the particular file to the second client computing device in the background process:

determining, by the synchronization agent, that the communication of the particular file to the second client computing device is not yet complete;

modifying the background process to cause communication of the particular file from the one or more remote backup storage devices to the second client computing device to complete the synchronization of the particular file to the second client computing device, wherein synchronization of the one or more backup files other than the particular file remains unchanged; and providing the user access to the synchronized particular file at the second client computing device.

2. The computer-implemented method of claim 1, wherein the particular file communicated to the second client computing device replaces a previous version of the particular file stored in the second primary storage device.

3. A computer-implemented method of providing access to files stored at one or more remote backup storage devices, the computer-implemented method comprising:

initiating, by a storage manager module executing in computer hardware comprising one or more computer processors, a backup operation, the backup operation comprising:

identifying, according to a storage policy, one or more original files stored in a first primary storage device associated with a first client computing device; and copying, according to a backup schedule specified by the storage policy, the one or more original files stored in the first primary storage device to one or more remote backup storage devices to create one or more backup files that correspond to the one or more original files;

accessing, by a synchronization module executing in the computer hardware comprising the one or more computer processors, user-defined synchronization criteria for identifying files to synchronize between the first primary storage device associated with the first client computing device and a second primary storage device associated with a second client computing device;

after the initiation of the backup operation, and based on the user-defined synchronization criteria, identifying the one or more backup files to be synchronized from the one or more remote backup storage devices to the second primary storage device;

communicating, to the second client computing device, a listing of the one or more backup files to be synchronized from the one or more remote backup storage devices to the second primary storage device;

after communicating the listing of the one or more backup files to the second client computing device, initiating a background process to communicate the one or more backup files from the one or more remote backup storage devices to the second primary storage device to synchronize the one or more backup files to the second primary storage device; and in response to receiving a request from the second client computing device for a particular file of the one or more backup files, wherein the request is received after said initiating the background process to communicate the one or more backup files to the second primary storage device and prior to completion of the communication of the particular file to the second primary storage device in the background process:

modifying the background process to cause communication of the particular file from the one or more remote backup storage devices to the second primary storage device by causing communication of a copy of the particular file from the one or more secondary storage devices to the second primary storage device to complete the synchronization of the particular file to the second primary storage device, wherein synchronization of the one or more backup files other than the particular file remains unchanged.

4. The computer-implemented method of claim 3, wherein the identification of the one or more backup files is performed in response to the backup operation.

5. The computer-implemented method of claim 3, wherein the particular file communicated to the second primary storage device replaces a previous version of the particular file stored in the second primary storage device.

6. The computer-implemented method of claim 3, further comprising:

receiving the user-defined synchronization criteria at the synchronization module; and storing the received user-defined synchronization criteria in an electronic data store accessible by the synchronization module.

7. The computer-implemented method of claim 6, wherein the user-defined synchronization criteria are received from a user of at least one of the first client computing device or the second client computing device.

8. The computer-implemented method of claim 6, wherein the electronic data store is associated with the storage manager module.

9. The computer-implemented method of claim 3, wherein the user-defined synchronization criteria include at least one of: file data, file contents, file metadata, file name, file location, or location information.

10. The computer-implemented method of claim 3, wherein identifying the one or more backup files to be synchronized from the one or more remote backup storage devices to the second primary storage device comprises, for each specific file of the one or more backup files:

determining whether the specific file is different from a previous version of the specific file stored in the one or more remote backup storage devices; and in response to determining that the specific file is different from the previous version of the specific file, identifying the specific file as a file to be synchronized.

11. A system for providing access to files stored at one or more remote backup storage devices, the system comprising:
- one or more hardware computer processors; and
- a storage manager executed by the one or more hardware computer processors, wherein the storage manager causes the one or more hardware computer processors to:
  - initiate a backup operation comprising:
    - identifying, according to a storage policy, one or more original files stored in a first primary storage device associated with a first client computing device; and
    - copying, according to a backup schedule specified by the storage policy, the one or more original files stored in the first primary storage device to one or more remote backup storage devices to create one or more backup files that correspond to the one or more original files; and
- a synchronization manager executed by the one or more hardware computer processors, wherein the synchronization manager causes the one or more hardware computer processors to:
  - access user-defined synchronization criteria for identifying files to synchronize between the first primary storage device associated with the first client computing device and a second primary storage device associated with a second client computing device;
  - after the initiation of the backup operation, and based on the user-defined synchronization criteria, identify the one or more backup files to be synchronized from the one or more remote backup storage devices to the second primary storage device;
  - communicate, to the second client computing device, a listing of the one or more backup files to be synchronized from the one or more remote backup storage devices to the second primary storage device;
  - after communicating the listing of the one or more backup files to the second client computing device, initiate a background process to communicate the one or more backup files from the one or more remote backup storage devices to the second primary storage device to synchronize the one or more backup files to the second primary storage device; and
  - in response to receiving a request from the second client computing device for a particular file of the one or more backup files, wherein the request is received after said initiating the background process to communicate the one or more backup files to the second primary storage device and prior to completion of the communication of the particular file to the second primary storage device in the background process:
    - modifying the background process to cause communication of the particular file from the one or more remote backup storage devices to the second primary storage device to complete the synchronization of the particular file to the second primary storage device, wherein synchronization of the one or more backup files other than the particular file remains unchanged.

12. The system of claim 11, wherein the identification of the one or more backup files is performed in response to the backup operation.

13. The system of claim 11, wherein the particular file communicated to the second primary storage device replaces a previous version of the particular file stored in the second primary storage device.

14. The system of claim 11, wherein the synchronization manager further causes the one or more hardware computer processors to:
- receive the user-defined synchronization criteria; and
- store the received user-defined synchronization criteria in an electronic data store accessible by the synchronization module.

15. The system of claim 11, wherein the synchronization manager further causes the one or more hardware computer processors to, as part of the identification of the one or more backup files to be synchronized from the one or more remote backup storage devices to the second primary storage device, for each specific file of the one or more backup files:
- determine whether the specific file is different from a previous version of the specific file stored in the one or more remote backup storage devices; and
- in response to determining that the specific file is different from the previous version of the specific file, identify the specific file as a file to be synchronized.

* * * * *